United States Patent
Wang et al.

(10) Patent No.: US 12,399,510 B2
(45) Date of Patent: Aug. 26, 2025

(54) CONTROL METHOD AND DEVICE OF UNMANNED AERIAL VEHICLE SYSTEM, UNMANNED AERIAL VEHICLE SYSTEM AND STORAGE MEDIUM

(71) Applicant: SZ DJI TECHNOLOGY CO., LTD., Shenzhen (CN)

(72) Inventors: Kai Wang, Shenzhen (CN); Peilu Si, Shenzhen (CN); Fu Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/542,543

(22) Filed: Dec. 15, 2023

(65) Prior Publication Data
US 2024/0152162 A1 May 9, 2024

Related U.S. Application Data

(63) Continuation of application No. PCT/CN2021/100399, filed on Jun. 16, 2021.

(51) Int. Cl.
*B64D 45/04* (2006.01)
*B64C 27/54* (2006.01)
(Continued)

(52) U.S. Cl.
CPC .......... *G05D 1/6546* (2024.01); *B64C 27/54* (2013.01); *B64D 17/80* (2013.01); *B64D 45/04* (2013.01);
(Continued)

(58) Field of Classification Search
CPC .... G05D 1/6546; G05D 1/652; G05D 1/2244; G05D 2109/254; B64C 27/54;
(Continued)

(56) References Cited

U.S. PATENT DOCUMENTS

| | | | |
|---|---|---|---|
| 12,190,740 B2 * | 1/2025 | Yu | G08G 5/59 |
| 2003/0056409 A1 | 3/2003 | Herbert | |
| 2014/0350748 A1 * | 11/2014 | Fisher | G05D 1/0808 |
| | | | 701/4 |
| 2023/0373666 A1 * | 11/2023 | Katayama | B64D 25/00 |

FOREIGN PATENT DOCUMENTS

| | | |
|---|---|---|
| CN | 101259331 A | 9/2008 |
| CN | 104986339 A | 10/2015 |

(Continued)

OTHER PUBLICATIONS

International Search Report of PCT/CN2021/100399 (Mar. 22, 2022).

*Primary Examiner* — Mathew Franklin Gordon
(74) *Attorney, Agent, or Firm* — Fideli Law PLLC; Qiang Li

(57) ABSTRACT

An aircraft system includes an aircraft, which further includes at least one propeller to provide a flight power for the aircraft; a communication interface configured to communicate with a parachute; at least one storage medium, storing at least one set of instructions for controlling the aircraft system; and at least one processor in communication with the at least one memory. when the aircraft system is in operation, the at least processor executes the at least one set of instruction to: obtain a propeller locking instruction of the aircraft, and perform a corresponding operation based on the propeller locking instruction. The corresponding operation include a first operation. The first operation, corresponds to a scenario where the aircraft is in a flight state, includes: in response to the propeller locking instruction, the aircraft controlling the at least one propeller to stop and locking the at least one propeller, and deploying the parachute by the aircraft.

20 Claims, 10 Drawing Sheets

(51) Int. Cl.
  *B64D 17/80* (2006.01)
  *G05D 1/224* (2024.01)
  *G05D 1/652* (2024.01)
  *G05D 1/654* (2024.01)
  *B64D 45/00* (2006.01)
  *B64U 10/13* (2023.01)
  *B64U 101/00* (2023.01)
  *G05D 109/25* (2024.01)

(52) U.S. Cl.
  CPC ............ *G05D 1/2244* (2024.01); *G05D 1/652* (2024.01); *B64D 2045/0085* (2013.01); *B64U 10/13* (2023.01); *B64U 2101/00* (2023.01); *B64U 2201/20* (2023.01); *G05D 2109/254* (2024.01)

(58) Field of Classification Search
  CPC .................. B64D 17/80; B64D 45/04; B64D 2045/0085; B64U 10/13; B64U 2201/20; B64U 2101/00
  See application file for complete search history.

(56) References Cited

FOREIGN PATENT DOCUMENTS

| | | |
|---|---|---|
| CN | 104986340 A | 10/2015 |
| CN | 204688423 U | 10/2015 |
| CN | 204998779 U | 1/2016 |
| CN | 204998780 U | 1/2016 |
| CN | 106054903 A | 10/2016 |
| CN | 106828939 A | 6/2017 |
| CN | 108313313 A | 7/2018 |
| CN | 110291010 A | 9/2019 |
| CN | 110316389 A | 10/2019 |
| CN | 111752290 A | 10/2020 |
| CN | 111824413 A | 10/2020 |
| CN | 112173127 A | 1/2021 |
| CN | 112278289 A | 1/2021 |
| CN | 112389640 A | 2/2021 |
| CN | 212685917 U | 3/2021 |
| FR | 2502795 A1 | 10/1982 |

* cited by examiner

CONTROL METHOD AND DEVICE OF UNMANNED AERIAL VEHICLE SYSTEM, UNMANNED AERIAL VEHICLE SYSTEM AND STORAGE MEDIUM

RELATED APPLICATIONS

This application is a continuation application of PCT application No. PCT/CN2021/100399, filed on Jun. 16, 2021, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technical field of unmanned aerial vehicles (UAVs), and in particular to a control method and device of an unmanned aerial vehicle system, an unmanned aerial vehicle system and a storage medium.

BACKGROUND

With the rapid development of science and technology, UAVs have played an increasingly important role in modern production and life. With the popularity of UAVs, the safety of UAV operation has gradually attracted people's attention. In order to prevent a UAV from free-falling from a high altitude, a common practice is to install a parachute on the UAVs. The mechanism is as follows: by installing an external parachute, the parachute may be triggered to deploy after a UAV is detected with an abnormality, such that the damage to the UAV and ground equipment caused by high-speed falling may be reduced.

Most existing parachutes use electronic parachute starters to trigger the parachute to deploy. After a parachute is deployed, since the UAV is in the process of continuous descent, the blades of a motor(s) on the UAV may continuously rotate driven by an updraft, and an excessive rotation speed may entangle the parachute cords. This may not only affect the protective effect of the parachute, but may even cause damage to personnel before landing.

SUMMARY

The present disclosure provides a control method and device of a unmanned aerial vehicle system, an unmanned aerial vehicle system, and a storage medium, in order to solve the following problems in the existing technologies: after a parachute is deployed, since the UAV is in the process of continuous descent, the blades of a motor(s) on the UAV may continuously rotate driven by an updraft, and an excessive rotation speed may entangle the parachute cords. This may not only affect the protective effect of the parachute, but may even cause damage to personnel before landing.

An aspect of the present disclosure provides an aircraft system, including: an aircraft, including: an aircraft, including: at least one propeller to provide a flight power for the aircraft; a communication interface configured to communicate with a parachute; at least one storage medium, storing at least one set of instructions for controlling the aircraft system; and at least one processor in communication with the at least one storage medium, where during operation, the at least one processor executes the at least one set of instruction to: obtain a propeller locking instruction to the aircraft, and perform a corresponding operation based on the propeller locking instruction, where the corresponding operation includes a first operation, and the first operation, corresponding to a scenario where the aircraft is in a flight state, includes: in response to the propeller locking instruction, controlling the at least one propeller to stop and, and deploying the parachute.

Another aspect of the present disclosure provides a method for controlling an aircraft system, including: obtaining, by an aircraft, a propeller locking instruction, where the aircraft is equipped with a parachute, and the aircraft includes at least one propeller to provide flight power; and performing a corresponding operation based on the propeller locking instruction, where the corresponding operation include a first operation, the first operation corresponds to a scenario where the aircraft is in a flight state and includes: in response to the propeller locking instruction, controlling, by the aircraft, the at least one propeller to stop and locking the at least one propeller, and deploying, by the aircraft, the parachute.

Yet another aspect of the present disclosure provides a parachute, including: at least one storage medium storing at least one set of instructions for controlling an aircraft system, where the aircraft system includes an aircraft, which includes at least one propeller to provide a flight power for the aircraft, and a communication interface in communication with the parachute; at least one processor in communication with the at least one storage medium, where during operation, the at least one processor executes the at least one set of instructions to: obtain a propeller locking instruction to the aircraft, send the propeller locking instruction to the aircraft to control the at least one propeller to stop and lock, based on the propeller locking instruction, and deploy the parachute.

According to the technical solutions provided by exemplary embodiments of the present disclosure, obtain a propeller locking instruction of a UAV, control a propeller(s) to stop and lock the propeller based on the propeller locking instruction, and then deploy a parachute, so as to effectively realizes that the parachute is deployed after the UAV controls the propeller to stop and locks the propeller. This effectively avoids the entanglement between the propeller on the UAV and lines on the parachute. This may not only ensure the protective effect of the parachute on the UAV, but also ensure the safety and reliability of the operation of the UAV system, effectively improving the practicality of the UAV system.

BRIEF DESCRIPTION OF THE DRAWINGS

The drawings described herein provide a further understanding of the present disclosure, and form a part of the present disclosure. The illustrative embodiments and descriptions of the present disclosure are used to explain the present disclosure and do not constitute any improper limitation of the present disclosure. In the drawings.

DETAILED DESCRIPTION

Figure 1:
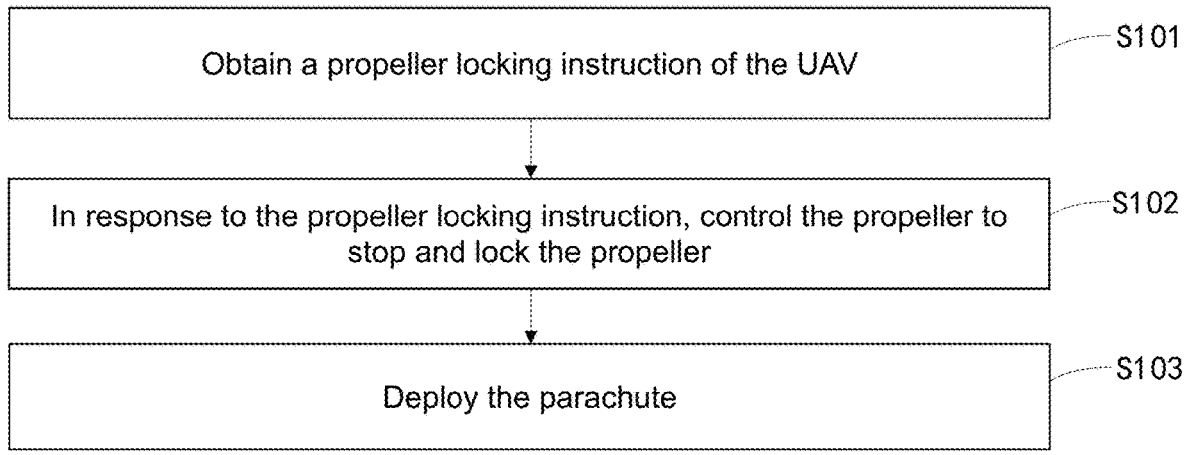
FIG. 1 is a schematic flow chat of a control method for a UAV system according to some exemplary embodiments of the present disclosure.

The technical solutions in some exemplary embodiments of the present disclosure will be described below with reference to the accompanying drawings in the embodiments of the present disclosure. Obviously, the described embodiments are part of the embodiments of the present disclosure, but not all of the embodiments. Based on the exemplary embodiments in the present disclosure, all other embodiments obtained by a person of ordinary skill in the art without creative efforts fall within the scope of protection of the present disclosure.

Unless otherwise defined, all technical and scientific terms used herein have the same meaning as commonly understood by a person of ordinary skill in the technical field to which the invention belongs. The terminology used herein in the description of the present disclosure is for the purpose of describing specific exemplary embodiments only and is not intended to limit the present disclosure.

To facilitate understanding of the technical solutions and technical effects of the present disclosure, the existing technologies will be briefly described below:

With the rapid development of science and technology, UAVs (the present disclosure is not limited to UAVs, but may be applied to any movable platform) have played an increasingly important role in modern production and life. With the popularity of UAVs, the safety of UAV operation has gradually attracted people's attention. In order to prevent a UAV from free-falling from a high altitude, a common practice is to install a parachute on the UAVs. The mechanism is as follows: by installing an external parachute, the parachute may be triggered to deploy after a UAV is detected with an abnormality, such that the damage to the UAV and ground equipment caused by high-speed falling may be reduced.

Most existing parachutes use electronic parachute starters to trigger the deploying action of the parachute. Specifically, electronic parachute starters may be generally divided into two categories, manual parachute starters and automatic parachute starters; among them, an automatic parachute starter mainly includes a pressure sensor, a temperature sensor, an acceleration sensor, an MCU (Microcontroller Unit) processing circuit, a battery, and a trigger (such as a detonator). When a problem occurs with a UAV, the pressure sensor may be used to collect changes in air pressure to detect the altitude, the temperature sensor may be used to collect temperature changes to perform altitude compensation, and the acceleration sensor may be used to collect acceleration information to determine the falling state and distance. If the UAV reaches a preset altitude from the ground and the parachute meets the deploying conditions, the MCU processing circuit may output an electrical signal to trigger the detonator or gas bottle to deploy the parachute bag, so as to complete the parachute deploying action. A manual parachute starter is often connected to a remote controller. According to a remote instruction from an operator, the parachute deploying action may be executed. The mechanism of the parachute deploying action in this case is similar to that of the electronic parachute starter. For details, please refer to the above description, and the details will not be repeated herein.

For a UAV, the UAV body often has interfaces that may be used for power supply and communication. A load device located on the UAV may communicate with the UAV through a preset interface, and may also perform state monitoring, information synchronization, instruction triggering, etc. However, since the parachute is independent of the UAV, and the parachute needs to be independently powered, in such a case, the parachute cannot transmit its own state/state to the UAV. Therefore, existing UAVs have the following shortcomings:

(1) When the parachute on the UAV is malfunctioning, the UAV cannot make an accurate judgment. In this case, if the UAV takes off as usual without any protection, there may be safety risks.

(2) Even if the parachute functions normally when the UAV takes off, considering various uncertainties in the air, the parachute may not transmit back the latest state information in real time. This may have negative effects on the operator's judgment on potential risks when the UAV is operating.

(3) Even if everything is normal with the parachute, the parachute may be deployed normally, after the parachute deploying operation, since the UAV is in the process of continuous descent, the blades of a motor(s) on the UAV may continuously rotate driven by an updraft, and an excessive rotation speed may entangle the parachute cords. This may not only affect the protective effect of the parachute, but may even cause damage to personnel before landing.

In order to solve the above technical problems, in conjunction with the accompanying drawings, some exemplary embodiments of the present disclosure provide a UAV system control method and device, a UAV system and a storage medium. Some exemplary embodiments of the present disclosure will be described in detail below. The following exemplary embodiments and the features in the embodiments may be combined with each other as long as there is no conflict for the combinations.

Figure 2:
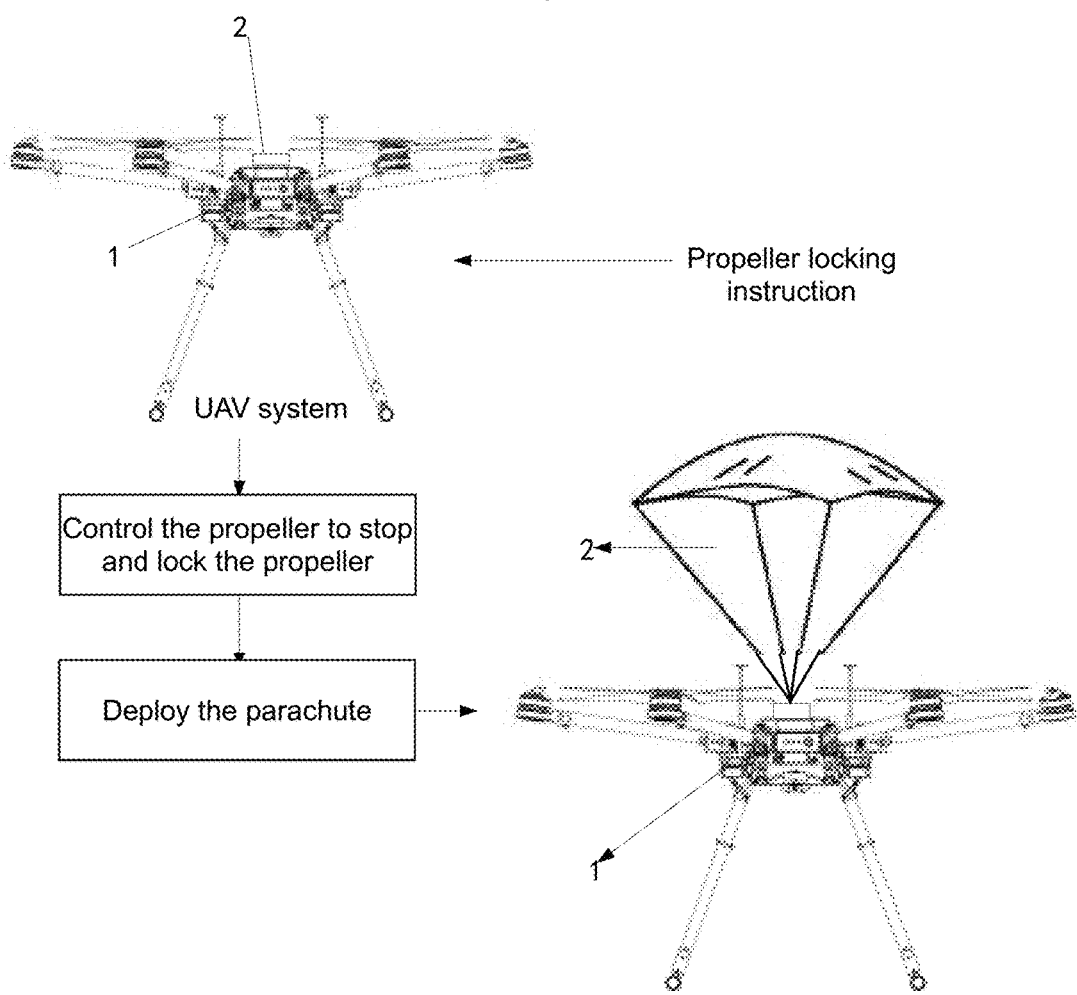
FIG. 2 is a schematic scenario diagram of a control method for a UAV system according to some exemplary embodiments of the present disclosure.

FIG. 1 is a schematic flow chat of a control method for a UAV system according to some exemplary embodiments of the present disclosure. FIG. 2 is a schematic scenario diagram of a control method for a UAV system according to some exemplary embodiments of the present disclosure. Referring to FIGS. 1 and 2, some exemplary embodiments provide a control method for a UAV system. The UAV system may include a UAV 1 and a parachute 2 mounted on the UAV 1. The UAV 1 includes a propeller(s) for providing power. In addition, the execution subject of the above method may be a control device of the UAV system. It can be understood that the control device of the UAV system may be implemented as software, or a combination of software and hardware. In some specific implementations, the control device of the UAV system may be provided on the UAV 1 or the parachute 2. Alternatively, the control device for the UAV system may be provided independently of the UAV 1 and the parachute 2. In such a case, the control device may be in communication with the UAV 1 and the parachute 2, so as to be able to control the UAV 1 and the parachute 2.

Specifically, the UAV system control method may include the following steps:

Step S101: Obtain a propeller locking instruction of the UAV 1.

Step S102: In response to the propeller locking instruction, control the propeller to stop and lock the propeller.

Step S103: Deploy the parachute 2.

Each of the above steps will be explained in detail below:

Step S101: Obtain a propeller locking instruction of the UAV 1.

The propeller locking instruction herein refers to the instruction information used to stop and lock the propeller(s) on the UAV 1. Specifically, the present disclosure does not limit the specific acquisition method of propeller locking instruction. A person skilled in the art may make settings according to specific application scenarios or application requirements. In some examples, the UAV system may include a sensor for sensing flight state data of the UAV 1, where the sensor may be provided in the UAV 1 or in the parachute 2, or the sensor may include a first sensor provided in the UAV 1 and a second sensor provided in the parachute 2. The UAV's propeller locking instruction may then be obtained by the sensors included in the UAV system. In specific implementation, there may be the following implementation methods:

In some exemplary embodiments, when the sensor for sensing the flight state data of the UAV 1 is included in the UAV system, the sensor may be provided in the UAV 1, or the sensor may be provided in the parachute 2. In such a case, the obtaining of the propeller locking instruction of the UAV 1 may include: obtaining the flight state data of UAV 1 collected by the sensor; and if it is determined, based on the flight state data, that the UAV 1 has a flight fault, generating a propeller locking instruction.

Figure 3:
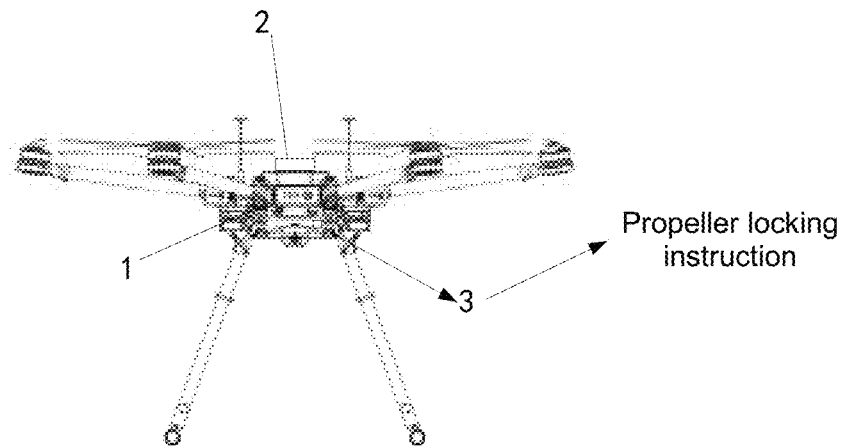
FIG. 3 is a schematic diagram of obtaining a propeller locking instruction of a UAV according to some exemplary embodiments of the present disclosure.

For example, with reference to FIG. 3, when a sensor 3 for detecting flight state data is provided on the UAV 1, the flight state data of the UAV 1 may be collected by the sensor 3. The flight state data may include at least one of the following: pressure data, temperature data, acceleration data, speed data, etc. After obtaining the flight state data, the flight state data may be analyzed and processed to determine whether the UAV 1 has a flight fault. Specifically, the flight state data may be analyzed and compared with a standard state data range used to identify that UAV 1 does not have a flight fault. When the flight state data is not within the standard state data range, it may be determined that the UAV 1 has a flight fault, that is, the UAV 1 is operating abnormally; when the flight state data is within the standard state data range, it may be determined that the UAV 1 does not have a flight fault, that is, UAV 1 is operating normally.

When it is determined that the UAV 1 has a flight fault, it means that the UAV system is operating abnormally at this time and the parachute 2 needs to be deployed, in order to avoid the parachute lines being entangled between parachute 2 and the propeller(s) on the UAV 1, the propeller locking instruction of UAV 1 may be generated. The propeller locking instruction is used to stop and lock the propeller of UAV 1, and then deploy parachute 2. Thus, the propeller locking instruction of the UAV 1 may be obtained stably. When it is determined that the UAV 1 does not have a flight fault, it means that the UAV system is operating normally, and there is no need to deploy the parachute 2 at this time. In order to avoid affecting the normal operating state of the UAV 1, the parachute 2 may be prohibited from starting.

Figure 4:
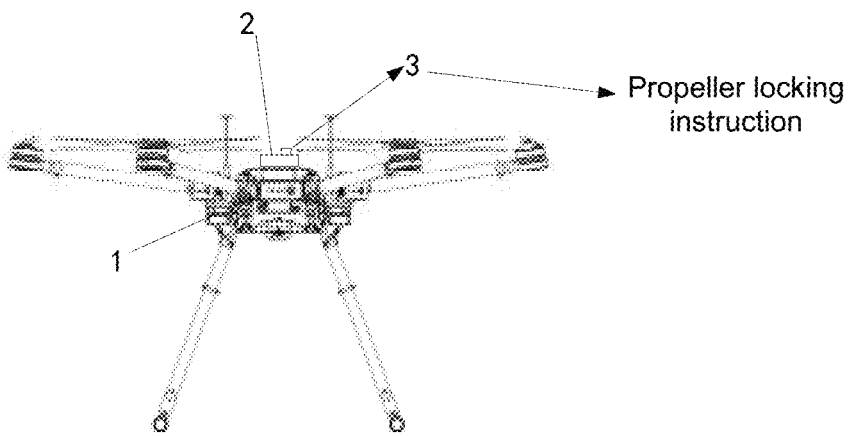
FIG. 4 is a schematic diagram of obtaining a propeller locking instruction of a UAV according to some exemplary embodiments of the present disclosure.

For example, with reference to FIG. 4, when the sensor 3 for detecting flight state data is provided on the parachute 2, since the parachute 2 is installed on the UAV 1, the flight state data of the UAV 1 can also be collected through the sensor 3. After obtaining the flight state data, the parachute 2 may analyze and process the flight state data to determine whether UAV 1 has a flight fault. In this case, the specific implementation process of "determining whether UAV 1 has a flight fault" mentioned here is similar to the specific implementation process of "determining whether UAV 1 has a flight fault" included in the above examples. For details, please refer to the above descriptions, and the details will not be repeated herein.

After the parachute 2 determines that the UAV 1 has a flight fault, it means that the UAV system is operating abnormally at this time and the parachute 2 needs to be deployed, in order to avoid the parachute lines being entangled between the parachute 2 and the propeller(s) on the UAV 1, the propeller locking instruction of UAV 1 can be generated. Thus, the propeller locking instruction of UAV 1 can be obtained stably. When it is determined that UAV 1 does not have a flight fault, it means that the UAV system is operating normally at this time, and there is no need to start the parachute 2 at this time. In order to avoid affecting the normal operation of the UAV 1, the parachute 2 may be prohibited from starting.

Figure 5:
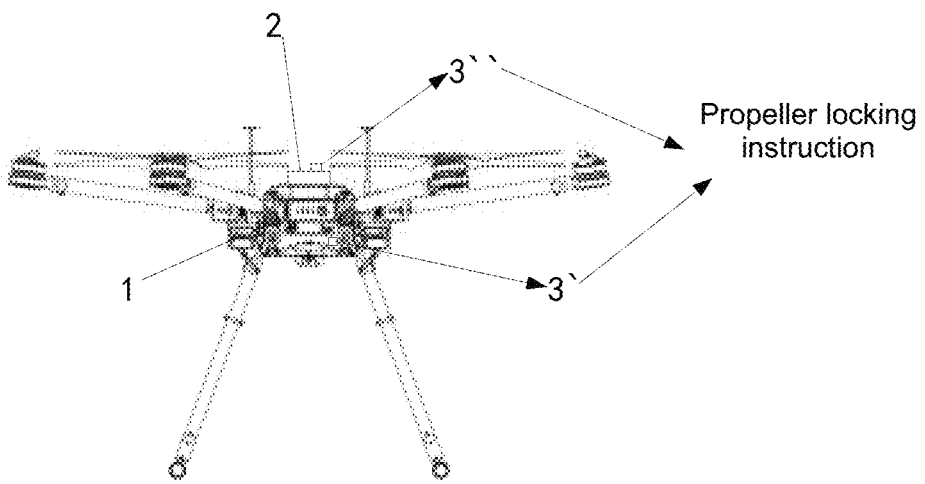
FIG. 5 is a schematic diagram of obtaining a propeller locking instruction of a UAV according to some exemplary embodiments of the present disclosure.

For example, with reference to FIG. 5, when the sensor include a first sensor 3' arranged in the UAV 1 and a second sensor 3" arranged in the parachute 2, in such a case, the obtaining of the flight state data of the UAV collected by the sensor may include: obtaining a first flight state data of the UAV 1 collected by the first sensor 3'; obtaining a second flight state data of the UAV 1 collected by the second sensor 3". Correspondingly, if it is determined that the UAV 1 has a flight fault based on the flight state data, and then generate the propeller locking instruction, this may include: determining whether UAV 1 has a flight fault based on at least one of the first flight state data or the second flight state data; and when it is determined that the UAV 1 has a flight fault, generating the propeller locking instruction.

When the flight state data of the UAV 1 includes the first flight state data of UAV 1 collected by the first sensor 3' and the second flight state data of UAV 1 collected by the second sensor 3", whether the UAV has a flight fault may be determined based on at least one of the first flight state data or the second flight state data. In some examples, if it is determined that the UAV 1 has a flight fault based on the first flight state data, or it is determined that the UAV 1 has a flight fault based on the second flight state data, the propeller locking instruction may be generated. Alternatively, if it is determined that the UAV 1 has a flight fault based on the first flight state data and it is determined that the UAV 1 has a flight fault based the second flight state data, a propeller locking instruction may be generated.

Specifically, there may be the following implementations.

In some exemplary embodiments, after obtaining the first flight state data and the second flight state data, when it is determined that the UAV 1 has a flight fault based on the first flight state data, regardless of whether UAV 1 has a flight fault based on the second flight state data, it may be determined that the UAV 1 has a flight fault; otherwise, it is determined that UAV 1 does not have a flight fault.

In some exemplary embodiments, after obtaining the first flight state data and the second flight state data, when it is determined that the UAV 1 has a flight fault based on the second flight state data, regardless of whether UAV 1 has a flight fault based on the first flight state data, it may be determined that the UAV 1 has a flight fault; otherwise, it is determined that UAV 1 does not have a flight fault. In the above exemplary embodiments, when a flight fault of the UAV 1 is detected based on any sensing data, it may be determined that the UAV has a flight fault. This can effectively ensure the safety of personnel located below the UAV 1.

In some exemplary embodiments, after obtaining the first flight state data and the second flight state data, whether the UAV 1 has a flight fault may be determined based on the first flight state data and the second flight state data. Specifically, only when it is determined that UAV 1 has a flight fault based on the first flight state data plus it is determined that UAV 1 has a flight fault based on the second flight state data, it may be determined that UAV 1 has a flight fault. Otherwise, it is determined that the UAV 1 does not have a flight fault.

In the above exemplary embodiments, the UAV 1 is determined to be in a flight fault state only when both the first flight state data and the second flight state data indicate that the UAV 1 has a flight fault. This effectively ensures the accuracy and reliability of detecting whether the UAV 1 is in flight fault. It avoids false detection due to one of the sensing data, reduces the number of times the UAV 1 starts the parachute due to false detection, and controls the number of times the UAV lands on the ground. This not only reduces the cost of replacing the parachute due to operating the parachute, but also reduces the risk of the UAV colliding with the ground or other obstacles due to landing with the propeller stopped, further improving the safety and reliability of UAV operation.

In some exemplary embodiments, other methods may also be used to obtain the propeller locking instruction of the UAV 1. Specifically, the obtaining of the propeller locking instruction of the UAV 1 may include: obtaining the propeller locking instruction sent by a control terminal that is in communication with the UAV system, where the propeller locking instruction may be generated by the control terminal upon detecting a propeller locking instruction operation from a user.

Figure 6:
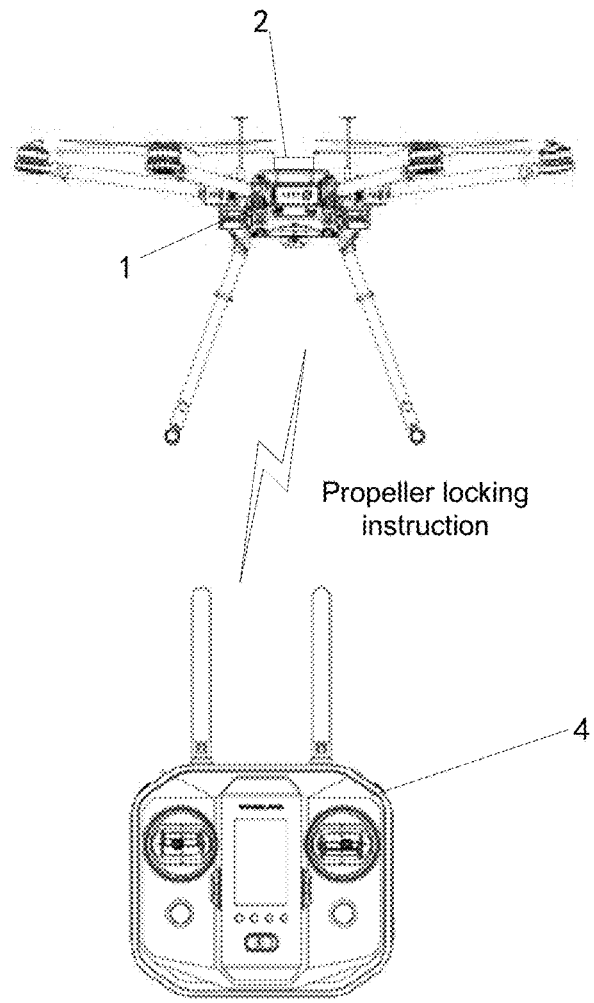
FIG. 6 is a schematic diagram of obtaining a propeller locking instruction of a UAV according to some exemplary embodiments of the present disclosure.

With reference to FIG. 6, the UAV system may be in communication with a control terminal 4. The control terminal 4 may control the UAV 1 and the parachute 2 included in the UAV system. The above-mentioned control terminal 4 may be provided with an operation interface for controlling the UAV system. A user may input a propeller locking instruction operation on the operation interface to generate a propeller locking instruction based on the input propeller locking instruction operation, and then the propeller locking instruction may be sent to the UAV system. This allows the UAV system to stably and effectively obtain the propeller locking instruction sent by the control terminal.

Of course, a person skilled in the art may also employ other methods to obtain the propeller locking instruction of the UAV 1, as long as the accuracy and reliability of obtaining the propeller locking instruction of the UAV 1 can be guaranteed, which will not be described again herein.

Step S102: In response to the propeller locking instruction, control the propeller to stop and lock the propeller.

After obtaining the propeller locking instruction, the propeller locking instruction may be analyzed and processed to control the propeller to stop and lock the propeller. In some examples, the UAV 1 may include a motor for mounting and driving a propeller. In this case, the controlling of the propeller to stop and lock the propeller may include: controlling the motor to stop rotating and preventing the motor from rotating, so as to stop the propeller and lock the propeller.

Specifically, after obtaining the propeller locking instruction, a zero voltage vector or a fixed voltage vector may be generated based on the propeller locking instruction, and then the motor is controlled to stop rotating based on the zero voltage vector or the fixed voltage vector. In this case, the motor does not rotate with the aerodynamic force existing in the environment. This effectively avoids the entanglement issue between the motor and the propeller, thereby effectively stopping the propeller and locking the propeller.

In addition, in order to ensure the safety and reliability of the UAV system operation, in some examples, after obtaining the propeller locking instruction of the UAV 1, the method may further include: detecting whether the UAV 1 is in a flight state; when the UAV 1 is in flight, it is allowed to respond to the propeller locking instruction; when UAV 1 is not in flight, it refuses to respond to the propeller locking instruction.

Specifically, the operating state data of the UAV 1 may be obtained to detect whether the UAV 1 is in a flight state based on the operating state data (including: temperature data, pressure data, distance data from the ground, etc.). When the UAV 1 is in flight, it means that the UAV 1 is flying in the sky at this time, if the UAV 1 system is in an abnormal operating state, such as parachute 2 abnormality, UAV 1 abnormality, etc., in such a case, in order to avoid or reduce the damage to the UAV 1 itself and the ground equipment caused by high-speed falling, it may be necessary to stop the rotation of the propeller of the UAV 1 and lock the propeller, and then the parachute 2 deploying operation may be carried out. Therefore, after obtaining the propeller locking instruction, the UAV 1 is allowed to respond to the propeller locking instruction. This effectively realizes that when the UAV 1 is in a flight state and the UAV 1 has a flight fault, firstly the propeller is controlled to stop and be locked, and then the parachute 2 is deployed. This effectively ensures the protective effect of the parachute 2 on the UAV 1.

When the UAV 1 is not in flight, it means that the UAV 1 is on the ground at this time and is not operating in the sky, in this case, regardless of whether the UAV 1 is in an abnormal operating state, there is no need to deploy the parachute 2. Therefore, after obtaining the propeller locking instruction, the UAV 1 may be prohibited from responding to the propeller locking instruction. This effectively realizes that when the UAV 1 is not in flight, the parachute 2 is not deployed. This avoids invalid parachute 2 deploying operations and further improves the flexibility and reliability of this control method.

Step S103: Deploy the parachute 2.

After controlling the propeller to stop and locking the propeller, the parachute 2 may be deployed. This effectively realizes that the parachute 2 is deployed only after the propeller is stopped and locked, effectively avoiding the entanglement issue between the propeller on UAV 1 and the lines of the parachute 2, thereby ensuring the safety and reliability of the UAV system operation.

In addition, the present disclosure does not limit the specific implementation method of deploying the parachute 2. A person skilled in the art may make settings according to specific application scenarios or application requirements. For example, the parachute 2 may be provided with a deploying device for automatically starting the parachute 2. After controlling the propeller to stop and locking the propeller, an electrical signal for deploying the parachute 2 may be generated. The deploying device may be controlled by the electrical signal to realize the operation of automatically deploying the parachute 2 by the deploying device. Alternatively, the parachute 2 may be provided with a mechanical device for deploying the parachute 2. After controlling the propeller to stop and locking the propeller, a mechanical device may be adjusted manually to realize the operation of passively deploying the parachute 2 with the mechanical device.

According to the control method for the UAV system provided by the present disclosure, obtain the propeller locking instruction of the UAV, control the propeller to stop and lock the propeller based on the propeller locking instruction, and then the parachute is deployed, effectively realizing that after the UAV controls the propeller to stop and locks the propeller, the parachute is then deployed. This effectively avoids the entanglement issue between the propeller on the UAV and the lines on the parachute. This may not only ensure the protective effect of the parachute on the UAV, but also ensure the safety and reliability of the UAV system operation, effectively improving the practicality of the UAV system.

On the basis of the above exemplary embodiments, in order to further improve the practicality of the control method for the UAV system, the method may also include: monitoring the working state of the parachute to determine whether parachute fault indication information is obtained.

During the operation of the UAV system, for the parachute included in the UAV system, the working state of the parachute may include a normal state or an abnormal state. The different operating states of the parachute may affect the operating state of the UAV system. Therefore, in order to ensure the safety and reliability of UAV system operation, the working state of the parachute may be monitored. Specifically, the parachute may be provided with a sensor for monitoring the working state of the parachute. The sensor may include at least one of the following: a pressure sensor, a temperature sensor, etc. The working state of the parachute may be monitored based on the sensing data obtained by the sensor to determine whether parachute fault indication information is obtained. The fault indication information may include at least one of the following: the parachute being in a fault state, fault location information, fault advice information, and so on. Specifically, when it is determined that the parachute is in a fault state based on the obtained sensing data, for example, when the sensing data exceeds a preset standard data range, it means that the parachute is in a fault state; when the sensing data is within the standard data range, the parachute is not in a fault state. When it is determined that the parachute is in a fault state, parachute fault indication information may be obtained. When it is determined that the parachute is not in a fault state based on the obtained sensing data, the parachute fault indication information is not obtained.

In some examples, after monitoring the working state of the parachute, the method may further include: if the fault indication information is obtained, uploading the identity information of the UAV or the UAV user and/or the location of the UAV to a regulatory agency, or perform a fault indication information recording operation.

The UAV system includes a storage device, which may store data such as the UAV's identity (serial number) and UAV user's identity information. If the fault indication information is obtained, it means that the parachute is in a faulty state. At this time, if the UAV in the UAV system is still running, there may be certain operational risks. Therefore, in order to ensure the safety and reliability of UAV system operation, the UAV system may upload the identity information of the UAV or the UAV user and/or the location of the UAV to the regulatory agency. This enables the regulatory agency to promptly obtain relevant information about the UAV system with operational risks, thereby facilitating the regulatory agency to conduct regulatory operations on the UAV system based on at least one of the reported identity information of the UAV, identity information of the UAV user, and the location of the UAV.

For example, when the parachute fault indication information is obtained, it means that the parachute in the UAV system is in a fault state, in such a case, the identity information of the UAV system (for example, the identity of the UAV, the identity of the UAV user, etc.) may be uploaded to the regulatory agency (for example, the Aviation Administration). After the regulatory agency obtains the identity information of the UAV system, it may monitor the UAV system whose parachute is in a fault state based on the identity information of the UAV system.

For example, when the parachute fault indication information is obtained, it means that the parachute in the UAV system is in a fault state, in such a case, the location information of the UAV may be uploaded to the regulatory agency (such as the Aviation Administration). After the regulatory agency obtains the UAV's location information, it may monitor the UAV system whose parachute is in a fault state based on the UAV's location information, and facilitate the search and positioning operations of the UAV system based on the UAV's location information.

For example, when the parachute fault indication information is obtained, it means that the parachute in the UAV system is in a fault state, in such a case, the UAV system may be controlled to record the fault indication information, so as to view or retrieve the operating data and fault indication information of the UAV system when the UAV system is running abnormally, as well as analyze and process based on the retrieved operating data and fault indication information to determine the cause of the abnormality. This facilitates the updating of the UAV system's operating algorithm based on abnormality causes to further improve the safety and reliability of the UAV system's operation.

In some examples, the UAV system may include a storage device. The storage device may be used to store fault indication information and perform associated storage operations with the UAV's identity. Specifically, if the fault indication information is obtained, it means that the parachute is in a fault state, in such a case, if the UAV system operates abnormally, such as crashing, falling, etc., in order to facilitate viewing and retrieval of the UAV system's operating data, the fault indication information may be recorded, that is, the fault indication information recording operation is performed. Specifically, the fault indication information may be stored in association with the identity of the UAV. This facilitates correlation analysis between the UAV system's operating state and parachute fault indication information, further improving the stability and reliability of UAV system control.

In some exemplary embodiments, by monitoring the working state of the parachute, it may be determined whether the parachute fault indication information is obtained, and if the fault indication information is obtained, the identity of the UAV and or the UAV user and/or the location of the UAV may be uploaded to the regulatory agency, or, a fault indication information recording operation is carried out, thereby effectively enabling the regulatory agency to perform regulatory operations on the UAV system based on at least one of the received UAV identity, the UAV user identity, and the UAV location. This further ensures the safety and reliability of UAV system operation.

In some examples, since the UAV in the UAV system may be in flight or not in flight, in order to ensure the safety and reliability of UAV operation, when the UAV is in different operating states, it may correspond based on different control strategies. Specifically, the method may also include: when the UAV is in the flight state, if the parachute fault indication information is obtained, controlling the UAV to perform a first safety operation.

When the UAV is in flight and the parachute fault indication information is obtained, it means that when the UAV is flying in the air, the parachute mounted on the UAV is in a fault operating state. In this case, in order to ensure the safety and reliability of the UAV system operation, the UAV may be controlled to perform the first safety operation.

Specifically, the controlling of the UAV to perform the first safety operation may include: controlling the UAV to land or return.

Specifically, after it is determined that the UAV is flying over a crowd, in order to ensure the safety of the UAV and the crowd, the controlling of the UAV to land or return may include: determining a landing route or return route of the UAV, where the landing route or return route should avoid the area where the crowd is, and then controlling the UAV to perform a landing or return operations based on the landing route or return route, thus effectively ensuring the safety of the UAV system operation and the safety of the crowd.

In some examples, the controlling of the UAV to land or return may include: detecting whether the UAV is in a state of flying over a crowd; when it is determined that the UAV is in the state of flying over a crowd, controlling the UAV to land or return.

Specifically, when the UAV is in flight, the UAV may be flying over a crowd. In this case, in order to ensure the safety of the UAV operation and the safety of the crowd, the UAV may be controlled to land or return. In some examples, the detecting whether the UAV is in a state of flying over the crowd may include: determining whether the UAV is located in a crowd activity area; and if the UAV is located in the crowd activity area, determining that the UAV is in the state of flying over a crowd.

The determining whether the UAV is located in the crowd activity area may include: obtaining a position collected by the UAV's satellite positioning device; determining whether the UAV's position is located in a crowd activity area based on the position; if the position of the UAV is determined to be in the crowd activity area, determining that the UAV is in a state of flying over a crowd; otherwise, determining that the UAV is not in the state of flying over a crowd.

It should be noted that the crowd activity area may refer to an area where people are performing activities, an area where people may perform activities, or a range where people may carry out activities, for example, the crowd activity range may be areas where human activities exist, building areas (residential buildings, stadiums, shopping malls, etc.), square areas, etc. In order to accurately detect whether the UAV is flying over the crowd, a satellite positioning device is installed on the UAV, and the position information of the UAV may be collected by the satellite positioning device, and then the position may be analyzed and processed to determine whether the UAV is in a crowd activity area. Specifically, the collected UAV position is analyzed and compared with a preset area range marked as the crowd activity areas. When the UAV is located in the crowd activity area, it may be determined that the UAV is flying over a crowd. When the UAV is not located in the crowd activity area, it may be determined that the UAV is not in a state of flying over a crowd. This effectively realizes the detection operation of whether the UAV is flying over a crowd.

In some examples, the detecting whether the UAV is in a state of flying over a crowd may include: obtaining sensing data collected by an imaging device or temperature sensor of the UAV; detecting whether there a crowd in a surrounding environment where the UAV is located based on the sensing data; and if it is determined that there is a crowd in the surrounding environment where the UAV is located, determining that the UAV is in the state of leaping over a crowd; otherwise, determining that the UAV is not in a state of flying over a crowd.

In order to accurately detect whether the UAV is flying over a crowd, an imaging device or temperature sensor may be installed on the UAV. It could be understood that the sensing data corresponding to the crowd activity area may be different from the sensing data corresponding to a non-crowd activity area. For example: the sensing data corresponding to the crowd activity area includes crowd images, or the environmental temperature information of the sensing data corresponding to the crowd activity area is within a set range. The sensing data corresponding to the non-crowd activity area includes non-crowd images, or the environmental temperature information of the sensing data corresponding to the crowd activity area is not within the set range. Therefore, whether the UAV is located in a crowd activity area may be determined based on the sensing data collected by the UAV's imaging device or temperature sensor.

In some examples, the image data may be obtained by the imaging device, and the temperature data of the area where the UAV is located may be collected by the temperature sensor. Specifically, when there is a crowd in the surrounding environment where the UAV is located, the temperature of a surrounding environment where the UAV is located may be higher than the temperature of a surrounding environment when there is no crowd. When there is a crowd in the surrounding environment where the UAV is located, the image data collected by the imaging device on the UAV may include at least one person. Specifically, after obtaining the above-mentioned collected sensing data, the sensing data may be analyzed and processed to detect whether there is a crowd in the surrounding environment where the UAV is located. When it is determined that there is a crowd in the surrounding environment where the UAV is located, it may be determined that the UAV is in a state of flying over a crowd; and when it is determined that there is no crowd in the surrounding environment where the UAV is located, it may be determined that the UAV is not in the state of flying over a crowd. This effectively realizes the detection operation of whether the UAV is flying over a crowd.

Of course, a person skilled in the art may use other methods to detect whether the UAV is flying over a crowd, as long as the accuracy and reliability of detecting whether the UAV is flying over the crowd is ensured. This will not be described in detail here.

In some examples, the method may also include: before the UAV takes off, if parachute fault indication information is obtained, refusing to respond to a taking off instruction from a user.

Specifically, before the UAV in the UAV system takes off, if the parachute fault indication information is obtained, it means that the parachute on the UAV is in a fault state, in this case, in order to ensure the safety and reliability of the UAV system operation, when the UAV's taking off instruction is obtained, the system may refuse to respond to the user's taking off instruction. That is, when the parachute is in a fault state, if the UAV is not in a take-off state, the UAV may be prohibited from flying.

Figure 7:
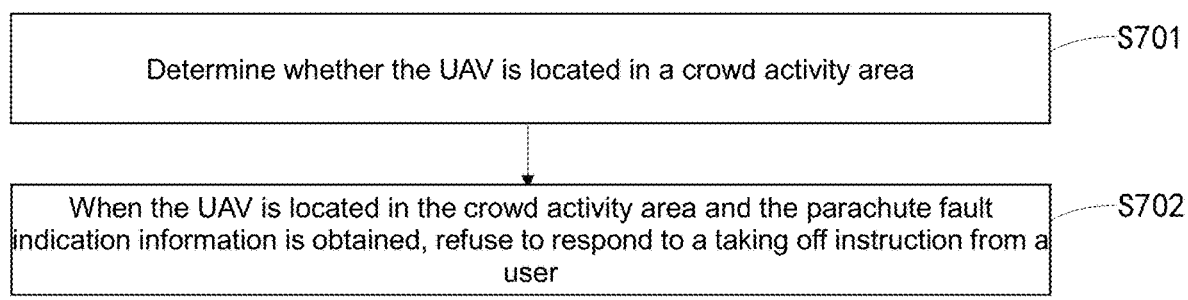
FIG. 7 is a schematic diagram of obtaining parachute fault indication information and refusing to respond to a taking off instruction from a user according to some exemplary embodiments of the present disclosure.

In addition, as shown in FIG. 7, after obtaining the parachute fault indication information, the refusing to respond to the user's taking off instruction may include:

Step S701: Determine whether the UAV is located in a crowd activity area.

Before the UAV takes off, during the process of controlling the UAV to land or return, in order to ensure the safety and reliability of the UAV operation, it may be detected whether the UAV is located in a crowd activity area. Specifically, this disclosure does not limit the implementation method of detecting whether the UAV is located in a crowd activity area. A person skilled in the art may make settings according to specific application scenarios or application requirements. In some examples, the determining whether the UAV is located in the crowd activity area may include: obtaining a position collected by the UAV's satellite positioning device; determining whether the UAV is located in the crowd activity area based on the position; if the position is located in the crowd activity area, determining that the UAV is located in the crowd activity area; otherwise, determining that the UAV is not located in the crowd activity area.

Specifically, the crowd activity area may refer to an area where a crowd may perform activities or an area where a crowd can perform activities. For example, the crowd activity area may be building areas (residential buildings, stadiums, shopping malls, etc.), square areas, etc. In order to accurately detect whether the UAV is located in a crowd activity area, a satellite positioning device is installed on the UAV, and the position information of the UAV may be collected by the satellite positioning device. The position may then be analyzed and processed to determine whether the UAV is in the crowd activity area. Specifically, the collected UAV position is analyzed and compared with a preset area range marked as a crowd activity area(s). When the UAV position is located in the crowd activity area, it may be determined that the UAV is in a state of flying over a crowd; when the UAV is not located in the crowd activity area, it may be determined that the UAV is not located in the crowd activity area. This effectively realizes the detection operation of whether the UAV is located in the crowd activity area.

In some examples, the determining whether the UAV is located in the crowd activity area may include: obtaining sensing data collected by the UAV's imaging device or temperature sensor; determining whether the UAV is located in the crowd activity area based on the sensing data; if it is determined that there is a crowd in the surrounding environment where the UAV is located, determining that the UAV is in the crowd activity area; otherwise, determining that the UAV is not in the crowd activity area.

In order to accurately detect whether the UAV is in the crowd activity area, an imaging device or temperature sensor may be installed on the UAV. Image data may be obtained by the imaging device, and temperature data of the area where the UAV is located may be collected by the temperature sensor. Specifically, when there is a crowd in the surrounding environment where the UAV is located, the temperature of the surrounding environment where the UAV is located may be higher than the temperature data of the surrounding environment when there is no crowd. When there is a crowd in the surrounding environment where the UAV is located, the image data collected by the imaging device on the UAV may include at least one person. Specifically, after obtaining the above-mentioned collected sensing data, the sensing data may be analyzed and processed to detect whether there is a crowd in the surrounding environment where the UAV is located. When it is determined that there is a crowd in the surrounding environment where the UAV is located, it may be determined that the UAV is in the crowd activity area; and when it is determined that there is no crowd in the surrounding environment where the UAV is located, it may be determined that the UAV is not flying over the crowd activity area. This effectively realizes the detection operation of whether the UAV is in the crowd activity area.

Of course, a person skilled in the art may use other methods to determine whether the UAV is located in a crowd activity area, as long as the accuracy and reliability of detecting whether the UAV is located in the crowd activity area can be ensured, which will not be described again herein.

Step S702: When the UAV is located in the crowd activity area and the parachute fault indication information is obtained, refuse to respond to a taking off instruction from a user.

When it is determined that the UAV is located in the crowd activity area and the parachute fault indication information is obtained, in such a case, if the UAV is controlled to take off, the operational safety of the UAV may not be ensured because the parachute is in a fault state. Furthermore, if the UAV is located in a crowd activity area, it may also pose a threat to the safety of the people in the crowd activity area. Therefore, in order to ensure the safety and reliability of UAV operation and the safety of the crowd, the system may refuse to respond to the user's taking off instruction so as to prohibit the UAV from taking off.

Figure 8:
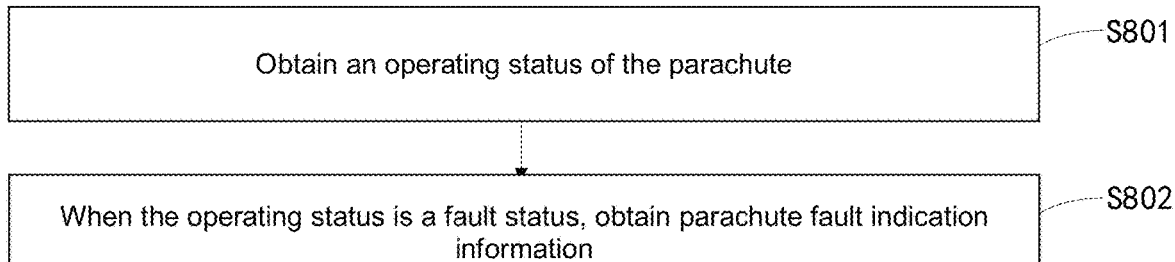
FIG. 8 is a schematic diagram of obtaining parachute fault indication information according to some exemplary embodiments of the present disclosure.

FIG. 8 is a schematic diagram of obtaining parachute fault indication information according to some exemplary embodiments of the present disclosure. Based on the above exemplary embodiments, with reference to FIG. 8, this disclosure further provides an implementation method for obtaining the parachute fault indication information. Specifically, the obtaining of the parachute fault indication information may include:

Step S801: Obtain an operating state of the parachute.

The operating state of the parachute may include a normal state or an abnormal state, and the parachute in different statees may have different impacts on the operational safety of the UAV system. Therefore, in order to accurately ensure the safety and reliability of UAV system operation, the operating state of the parachute may be obtained. Specifically, the obtaining of the operating state of the parachute may include: obtaining periodic self-check information of the parachute; and determining the operating state of the parachute based on the self-check information.

Specifically, in order to ensure the safety and reliability of UAV system operation, the parachute may perform periodic self-check operations, so that periodic self-check information of the parachute may be obtained. The self-check information may include at least one of the following: self-check information of the equipment included in the parachute, self-check information of the environment where the parachute is located; the self-check information of the equipment included in the above-mentioned parachute may include at least one of the following: self-check information of the MCU, self-check information of the parachute package, equipment service life information, communication connection state information, etc.; the self-check information of the environment where the parachute is located may include at least one of the following: pressure information, humidity information, temperature information, etc.

After obtaining the periodic self-check information of the parachute, the periodic self-check information of the parachute may be analyzed and processed to determine the operating state of the parachute. Specifically, the determining of the operating state of the parachute based on the self-check information may include: when the self-check information meets a set condition, determining that the operating state of the parachute is a normal state; and when the self-check information does not meet the set condition, determining that the operating state of the parachute is an abnormal state. This effectively ensures the accuracy and reliability of detecting the operating state of the parachute.

It should be noted that the execution subject that obtains the operating state of the parachute may be a parachute or a UAV. When the execution subject that obtains the operating state of the parachute is a UAV, the parachute may perform periodic self-check operations. In this way, the periodic self-check information of the parachute may be obtained. After obtaining the periodic self-check information of the parachute, the parachute may send the self-check information to the UAV, so that the UAV can obtain the periodic self-check information of the parachute, and the operating state of the parachute is then determined based on the self-check information.

When the execution subject for obtaining the operating state of the parachute is the parachute, the parachute may perform periodic self-check operations, so that the periodic self-check information of the parachute may be obtained. After obtaining the periodic self-check information of the parachute, the operating state of the parachute may be determined based on the self-check information. The parachute may then send the obtained operating state of the parachute to the UAV, so that the UAV may stably obtain the operating state of the parachute.

Step S802: When the operating state is a fault state, obtain parachute fault indication information.

When it is determined that the operating state of the parachute is a fault state, the parachute fault indication information may be obtained. The fault indication information may include at least one of the following: fault state, fault location, fault advice information, and so on. When it is determined that the operating state of the parachute is a non-fault state, it means that the operating state of the parachute is a normal state, the parachute fault indication information may not be obtained.

In some examples, after obtaining the parachute fault indication information, the method may further include: displaying the parachute fault indication information.

Specifically, the UAV may be in communication with a control terminal. After obtaining the parachute fault indication information, the parachute fault indication information may be sent to the control terminal. The fault indication information may be displayed by the control terminal, so that a user may quickly and directly obtain the parachute fault indication information.

In some exemplary embodiments, by obtaining the operating state of the parachute, when the operating state is a fault state, the parachute fault indication information is obtained. This enables the parachute fault indication information to be obtained stably and effectively when the parachute operates abnormally. Correspondingly, when the operating state of the parachute is normal, parachute fault indication information may not be generated. The safety and reliability of UAV system operation are further improved.

Figure 9:
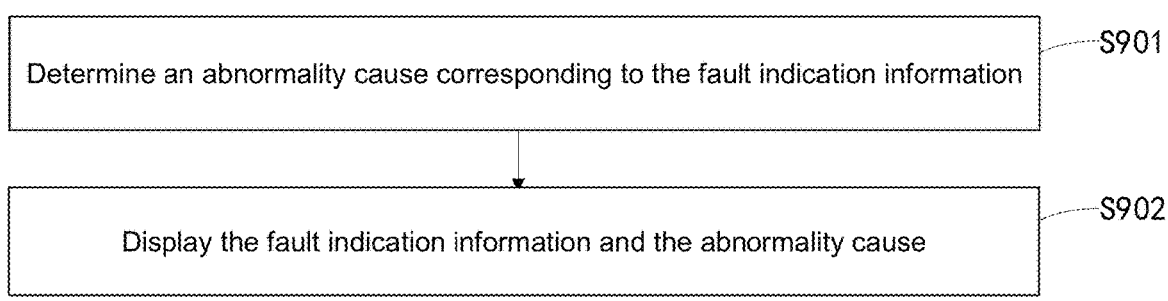
FIG. 9 is a schematic flow chat of a control method for a UAV system according to some exemplary embodiments of the present disclosure.

FIG. 9 is a schematic flow chat of a control method for a UAV system according to some exemplary embodiments of the present disclosure. Based on the above exemplary embodiments, with reference to FIG. 9, the method may also include:

Step S901: Determine an abnormality cause corresponding to the fault indication information.

Step S902: Display the fault indication information and the abnormality cause.

After obtaining the fault indication information, in order to facilitate the user to understand the fault type of the parachute and to perform troubleshooting or adjustment operation on the parachute, the cause of the fault corresponding to the fault indication information may be determined. Specifically, there may be a mapping relationship between the cause of the fault and the fault indication information. After determining the fault indication information, the cause of the abnormality may be determined based on the above mapping relationship. After obtaining the fault indication information and the cause of the fault, the fault indication information and the cause of the fault may be sent to the control terminal. The fault indication information and the cause of the fault may be displayed by the control terminal, so that the user may understand the parachute fault information based on the displayed fault indication information and the cause of the fault. This may also facilitate the user to perform troubleshooting operations on the parachute based on the learned fault information, thereby further improving the practicality of the UAV system control method.

Figure 10:
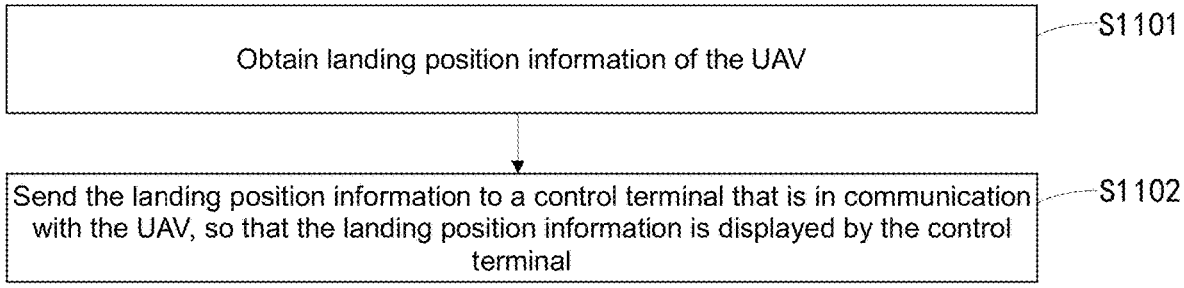
FIG. 10 is a schematic flow chat of a control method for a UAV system according to some exemplary embodiments of the present disclosure.

FIG. 10 is a schematic flow chat of a control method for a UAV system according to some exemplary embodiments of the present disclosure. Based on the above exemplary embodiments, with reference to FIG. 10, after starting the parachute, the method may further include:

Step S1101: Obtain landing position information of the UAV.

Step S1102: Send the landing position information to a control terminal that is in communication with the UAV, so that the landing position information is displayed by the control terminal.

After deploying the parachute, the UAV may land slowly under the action of the parachute. In order to accurately find the landed UAV, the landing position information of the UAV may be obtained. Specifically, the landing position information of the UAV may be obtained through the global positioning system on the UAV. The landing position information is then sent to a control terminal that is in communication with the UAV, so that the landing position information may be displayed by the control terminal. This allows a user to quickly find the landed UAV based on the displayed landing position information, thereby further improving the practicality of the control method.

In some exemplary embodiments, by obtaining the landing position information of the UAV and then displaying the landing position information, a user may quickly find the landed UAV based on the displayed landing position information. This may facilitate the searching operation for the UAV, thereby further improving the practicality of the control method.

Figure 11:
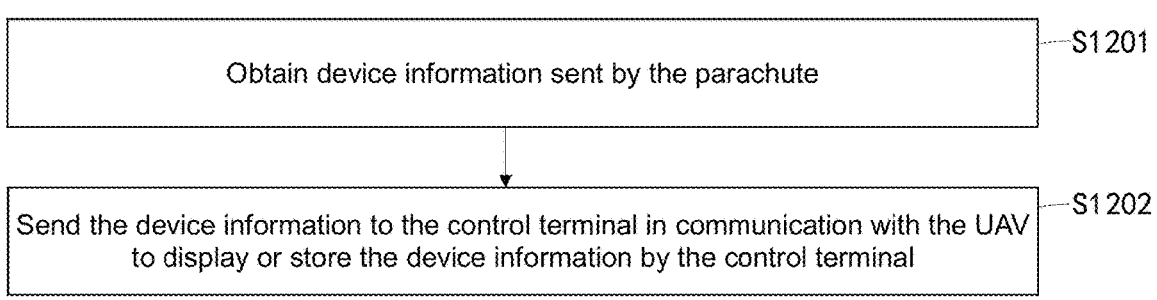
FIG. 11 is a schematic flow chat of a control method for a UAV system according to some exemplary embodiments of the present disclosure.

FIG. 11 is a schematic flow chat of a control method for a UAV system according to some exemplary embodiments of the present disclosure. Based on the above exemplary embodiments, with reference to FIG. 11, the method may further include:

Step S1201: Obtain device information sent by the parachute.

Step S1202: Send the device information to the control terminal in communication with the UAV to display or store the device information by the control terminal.

Before the UAV system is started, in order to ensure the safety and reliability of the UAV operation in the UAV system, the parachute may be installed to the UAV. When the parachute is installed to the UAV, a communication connection can be established between the parachute and a control terminal of the UAV system. Specifically, the device information sent by the parachute may be obtained. The device information may include at least one of the following: device number, manufacturer, device date, communication connection address, etc. After obtaining the device information sent by the parachute, the device information may be sent to the control terminal in communication with the UAV. This allows the control terminal to display the device information and store the device information sent by the parachute. This facilitates the establishment of a communication with the parachute based on the device information sent by the parachute. In this way, the UAV or parachute may be controlled by the control terminal, thereby further improving the stability and reliability of controlling the UAV system.

In some exemplary embodiments, by obtaining the device information sent by the parachute, and then sending the device information to the control terminal in communication with the UAV, the control terminal may display the device information or store the device information. This effectively enables data communication between the parachute and the UAV. This facilitates the control of UAV or parachute by the control terminal, thereby further improving the stability and reliability of controlling the UAV system.

In specific applications, this disclosure provides a control method for a UAV system. The UAV system includes a UAV and a parachute mounted on the UAV, where the UAV may include an aircraft used to achieve aerial photography operations, modeling operations, spreading operations, detection operations, and other operational tasks. The parachute may be connected to the UAV via a setting interface. In this way, the UAV may power the parachute via the above interface, and realize data communication between the UAV and the parachute.

Figure 12:
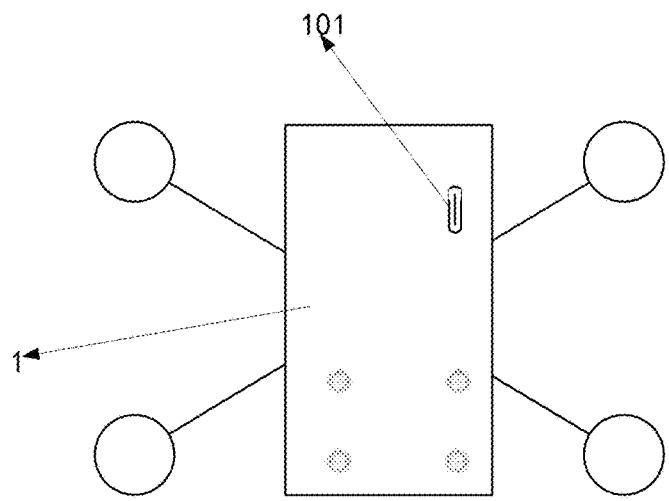
FIG. 12 is a schematic diagram of the structure of a UAV according to some exemplary embodiments of the present disclosure.

In order to enable data communication between the parachute and the UAV, in terms of hardware structure, as shown in FIG. 12, the UAV 1 may provide an external communication interface(s) and a power supply interface(s). The communication interface may realize data communication operations, and the power supply interface may perform power supply operations for the parachute. It could be understood that for convenience of use, the communication interface and the power supply interface may be made into the same interface 101. For example, the interface 101 on the UAV 1 may be a type-C interface. In this way, the parachute may communicate with the UAV 1 via the interface 101 provided on the UAV 1. The interface 101 may not only provide power for the parachute, but also support two-way communication between the parachute and the UAV 1.

In addition, the UAV 1 may also provide software development kit (SDK) function, that is, it may support third-party developers to develop SDK application devices on the platform thereof. Specifically, the parachute may adapt to the SDK application devices to complete data interaction or partial data interaction operations.

When installing the parachute onto the UAV, in order to ensure the safety and reliability of the parachute installation onto the UAV, the UAV may be provided with threaded mounting holes or snapping points. The above-mentioned mounting holes or snapping points may be used to install the mounting support of the parachute, and then the main part of the parachute may be connected to the mounting support via a quick connector, thereby effectively enabling the parachute to be detachably installed on the UAV. In this case, when installing the parachute on the UAV, in order to ensure the safety and reliability of the parachute, the parachute needs to be installed on the high-strength structure of the UAV. This allows the tension following the deployment of the parachute to act on the high-strength structure of the UAV. Specifically, the high-strength structure may be an arm of the UAV, that is, the tension following the deployment of the parachute may act on the arm of the UAV. During the use of the UAV system, the mounting support may remain on the UAV and may be packed into a UAV packaging box. The main body of the parachute may be quickly disassembled and packaged separately for shipping.

In terms of software, in order to enable data transmission between the UAV and the parachute, the UAV may provide a registration protocol. When the parachute MCU sends the registration command according to the agreed communication protocol, the UAV may record relevant registration information and push part of the parachute information to a ground terminal, and may display the relevant registration information of the parachute by the ground terminal. The displayed relevant registration information may prompt a user about the communication state between the parachute and the UAV.

In addition, the UAV may also support external display of third-party state protocols. After the parachute MCU sends state data according to the agreed protocol, the UAV may display the corresponding information on the ground terminal. This makes it easy to remind users to know the operating state of the parachute on the UAV in a timely manner. This makes it easy to trigger protective actions such as preventing takeoff, return, and landing when the parachute or UAV operates abnormally.

In addition, the UAV may provide a propeller stop protocol. After the parachute MCU sends a propeller stop instruction according to the agreed protocol, the propeller stop instruction may be sent to each electronic controller on the UAV based on the propeller stop instruction. After receiving the propeller stop instruction, the electronic controller(s) may stop the rotation of a drive motor(s), causing the UAV to lose power immediately. Furthermore, in order to prevent the propeller blades from continuing to rotate due to the airflow during landing, the electronic controller(s) may enter an active propeller locking mode.

Figure 13:
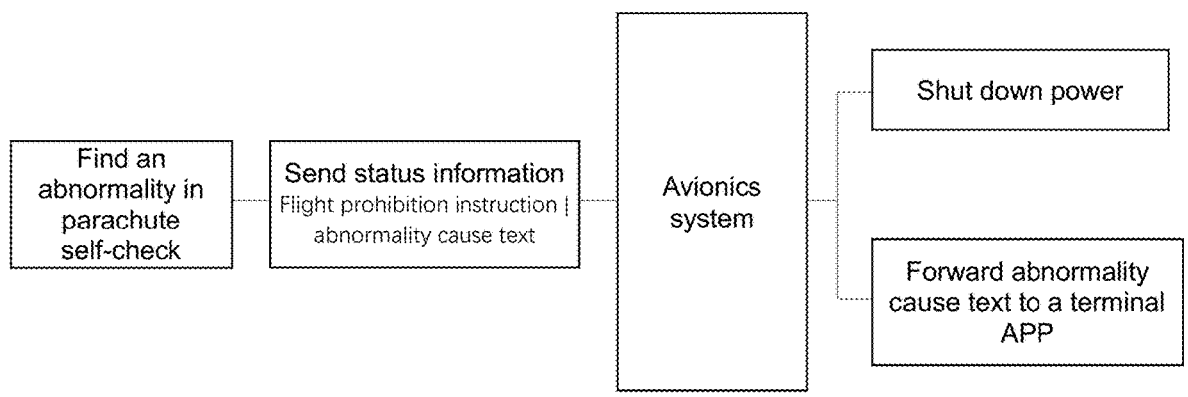
FIG. 13 is a schematic diagram of the mechanism of a control method for a UAV system according to some exemplary embodiments of the present disclosure.

Specifically, as shown in FIG. 13, this disclosure provides an implementation mechanism of a UAV system control method. The UAV system may include an avionics system. The avionics system may be configured to power the UAV and the parachute. The parachute may perform self-check operations based on the power provided by the avionics system. When the parachute detects in the self-check that the parachute is in an abnormal state, state information may be sent to the UAV. The state information may include abnormality cause text information or a flight prohibition instruction. The UAV may then be prohibited from flying based on the flight prohibition instruction. For example, the UAV may be controlled to turn off the power operation. After obtaining the abnormality cause text information, the abnormality cause text may be forwarded to a terminal APP, so that the terminal APP may display the abnormality cause text. This allows users to quickly and intuitively understand the abnormality information of the UAV system based on the displayed abnormality cause text.

Figure 14:
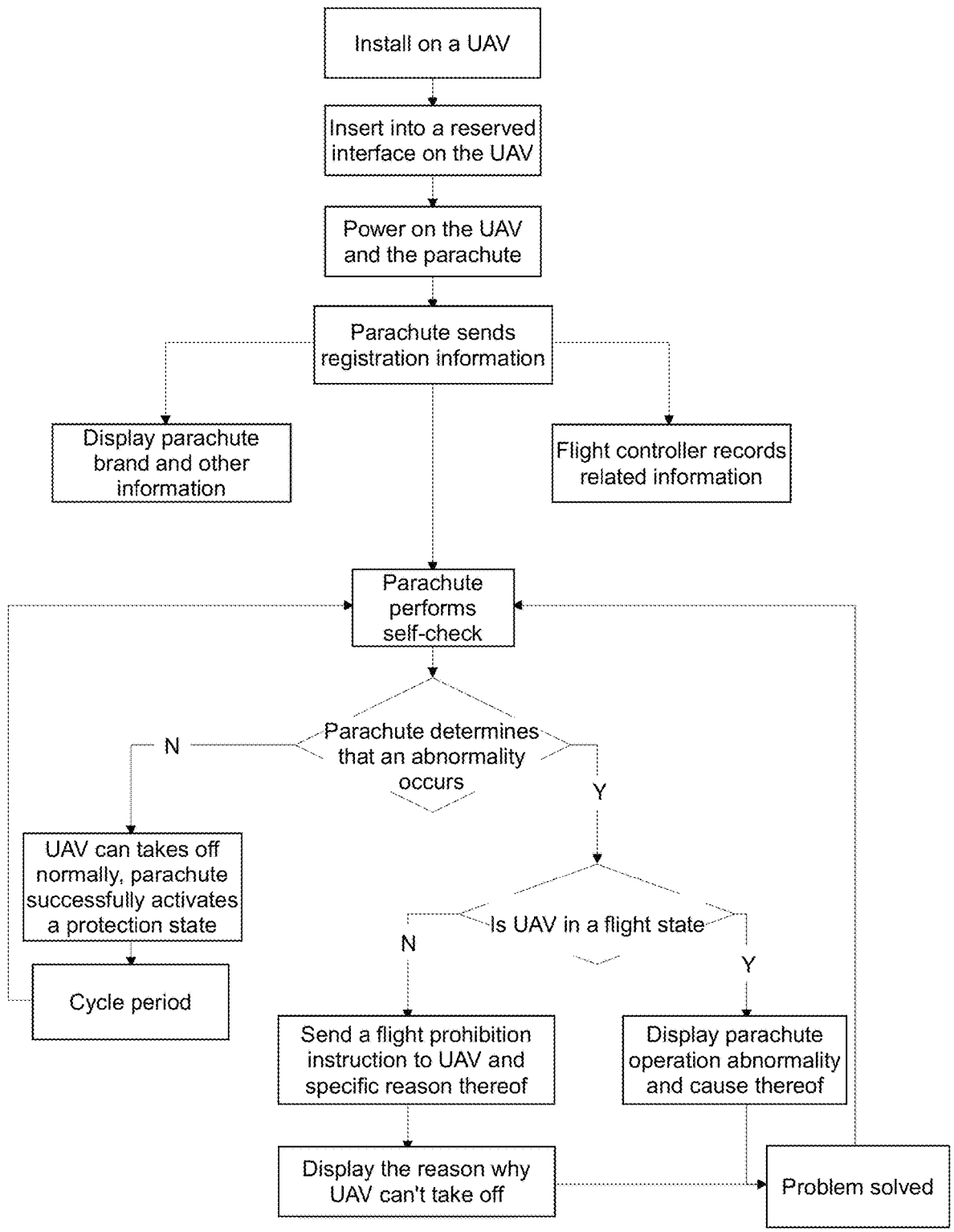
FIG. 14 is a schematic diagram of the mechanism of a control method for a UAV system according to some exemplary embodiments of the present disclosure.

The following describes the working process of the UAV system. With reference to FIG. 14, the execution subject of the control method of the UAV system herein may be the control terminal of the UAV system. When the control terminal executes the above control method of the UAV system, the following steps may be included:

Step 1: Install the parachute onto the UAV.

The UAV is provided with a reserved interface for installing a parachute. The parachute may be inserted into the reserved interface on the UAV so that the parachute can be installed on the UAV.

Step 2: Power on the UAV and the parachute.

For the parachute, the working process of the parachute may include: when the parachute is connected to the UAV, the parachute may be powered by the UAV. Furthermore, an energy storage unit may also be reserved in the parachute, such as a capacitor. In this way, when the UAV battery suddenly loses power, the parachute may still work normally for a period of time by reserving the energy storage unit. This may help improve the safety and reliability of UAV system operation.

Step 3: The parachute sends registration information to the UAV so that the control terminal can record the registration information of the parachute.

After the parachute is powered on, the parachute may register relevant parachute information with the UAV, such as: parachute brand, production date, product code, etc. The above parachute information may be recorded in the flight log and partially pushed to the ground terminal for display. For example, the parachute brand information may be displayed on a terminal APP, etc.

Step 4: The parachute performs a self-check operation.

The parachute begins to perform continuous self-check operation. If a major functional abnormality is found, a flight prohibition instruction may be sent to the UAV. In this case, the specific reason may be sent to the terminal APP by the UAV.

Step 5: Determine whether the parachute is abnormal.

Specifically, the self-check data obtained from the self-check operation may be analyzed and compared with a preset standard data range. When the self-check data is within the standard data range, it is determined that the parachute is operating normally; when the self-check data exceeds the standard data range, it is determined that the parachute is operating abnormally.

Step 6: After confirming that the parachute is operating normally, the UAV may proceed with the normal takeoff operation. At this time, the parachute can be successfully activated to protect the UAV. Afterwards, the parachute may perform the self-check operation periodically.

Step 7: After determining that the parachute is operating abnormally, detect whether the UAV is in flight.

Step 8: When the UAV is in flight, the abnormal operation of the parachute and its causes may be displayed, so that the user may perform a troubleshooting operation based on the abnormal operation of the parachute and the cause thereof.

After the UAV takes off, the parachute may periodically communicate with the UAV. In this way, the operating state of the parachute may be obtained, and the operating state of the parachute can be provided with different prompts to the user.

Step 9: When the UAV is not in flight, the parachute may send a flight prohibition instruction to the UAV to indicate the cause of the fault, so as to prohibit the UAV flight operation based on the flight prohibition instruction.

Specifically, when the UAV is not in flight (before the UAV takes off) and the parachute is in a fault state, a flight prohibition instruction may be generated, and then the UAV may be prohibited from performing the flight operation based on the flight prohibition instruction. That is, the UAV does not perform normal rotation and take-off operations when the parachute is in an abnormal state. This may effectively reduce the safety risks when the UAV system is operating.

Step 10: Use a display device on the control terminal to display the reason why the UAV cannot take off, so that the user may know the UAV's operating state in time.

Specifically, if an abnormality of the parachute is detected during the flight of the UAV, the reason why it cannot take off can be displayed on the ground terminal and a user operation suggestion may be provided. Users may perform troubleshooting operations based on the displayed prompt information and the operation suggestion. After the troubleshooting, the UAV enters a flight-ready state and may activate the parachute's flight protection function for the UAV. This effectively ensures the stability and reliability of the UAV system control method.

Figure 15:
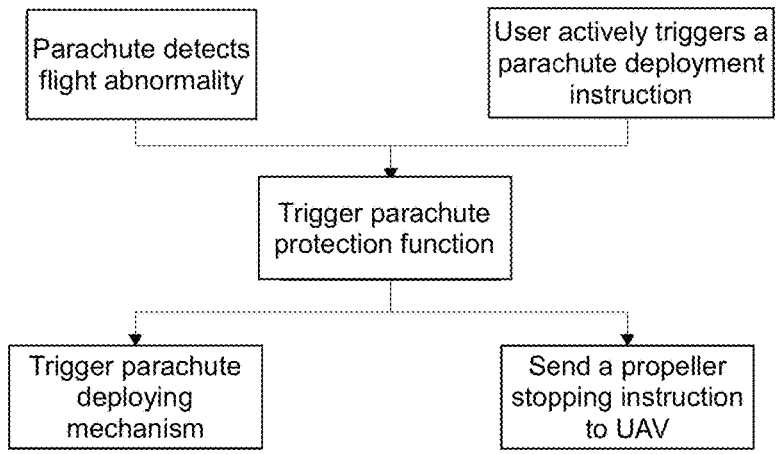
FIG. 15 is a schematic diagram of the mechanism of a control method for a UAV system according to some exemplary embodiments of the present disclosure.

Step 11: When the UAV is in flight and it is detected that the UAV is in an abnormal state, the parachute protection function may be triggered. With reference to FIG. 15, when the UAV is in flight and it is detected that the UAV is in an abnormal state, the parachute protection function may be triggered. Specifically, a propeller stopping instruction may be generated and sent to the UAV, After the UAV obtains the propeller stopping instruction, it may control the propeller(s) on the UAV to stop and lock the propeller(s) on the UAV. In some examples, after obtaining the propeller stopping instruction, the electronic controller on the UAV may be made to output a zero voltage vector immediately after receiving the propeller stopping instruction. Specifically, after braking the propeller, the electronic controller may still maintain the output of the zero voltage vector until the landing is completed so as to increase the rotational resistance of the motor and the propeller. This enables rapid braking of the propeller on the UAV. Alternatively, the electronic controller may be controlled to output a fixed voltage vector. This may lock the motor and propeller in a fixed electrical position. It is understood that the length of the braking process may vary based on the motor and blade. In general, the time of the braking process may range from a few milliseconds to hundreds of milliseconds.

In order to prevent the following problem from occurring during the descent of the UAV: the propeller may rotate due to the influence of the updraft, and the parachute lines may be entangled to affect the deployment and protection effect of the parachute, after the propeller is stopped and locked, the parachute may be deployed. That is, after the braking is completed, the parachute is controlled to be deployed. Specifically, the parachute may be thrown ejected by explosion or high-pressure gas, so that the UAV, after stopping the propeller, may land slowly under the protection of the parachute. This effectively enables the UAV to land at a controllable speed, and after the landing, the user may retrieve the UAV nearby based on the last position sent back by the UAV.

In some examples, when the UAV is in flight, the parachute may rely on sensors to detect that the UAV is in an abnormal and uncontrollable state, and the parachute's protective function can be triggered. In addition, when receiving a parachute deploying instruction actively triggered by a user, the parachute's protection function may also be triggered. This effectively realizes the protection function of the UAV when the user actively triggers the parachute.

According to the control method for the UAV system provided by the present disclosure, the UAV and the parachute may be connected via a communication interface. For the parachute, this communication interface has both communication and power supply functions. Therefore, this control method may achieve the following process:

(1) After the UAV communicates with the parachute, the parachute may perform a self-check operation periodically. Before the user controls the UAV to take off, the parachute performs self-check and may communicate to inform the UAV. Users may intuitively and quickly learn the operating state of the parachute. When the parachute is in an abnormal state, the UAV may be prevented from performing the flight operation. A warning indication may also be generated to avoid unprotected flights.

(2) When the UAV is in flight, the parachute performs periodic self-check operations and may communicate with the UAV. If the parachute fails, an alarm indication may be generated. Users may know the fault operation state of the parachute in time, and may make corresponding safety operation measures based on the fault operation state of the parachute so as to reduce UAV flight safety risks.

(3) After the UAV is in flight and the UAV has a fault, for example: when it is detected (as obtained by sensor detection, user observation, etc.) that the UAV's attitude is uncontrollable, it may be determined that the UAV has a fault. In this case, in order to ensure the safety and reliability of UAV operation, a propeller stopping instruction may be generated. After the UAV receives the propeller stopping instruction, it may trigger the motor to stop the propeller and lock the propeller. After locking the propeller, the parachute may be deployed. This allows the UAV to brake and lock the power system immediately, and may also effectively avoid or reduce the risk of parachute lines entanglement issue between the parachute and the propeller, thereby ensuring the safety and reliability of UAV operation.

Figure 16:
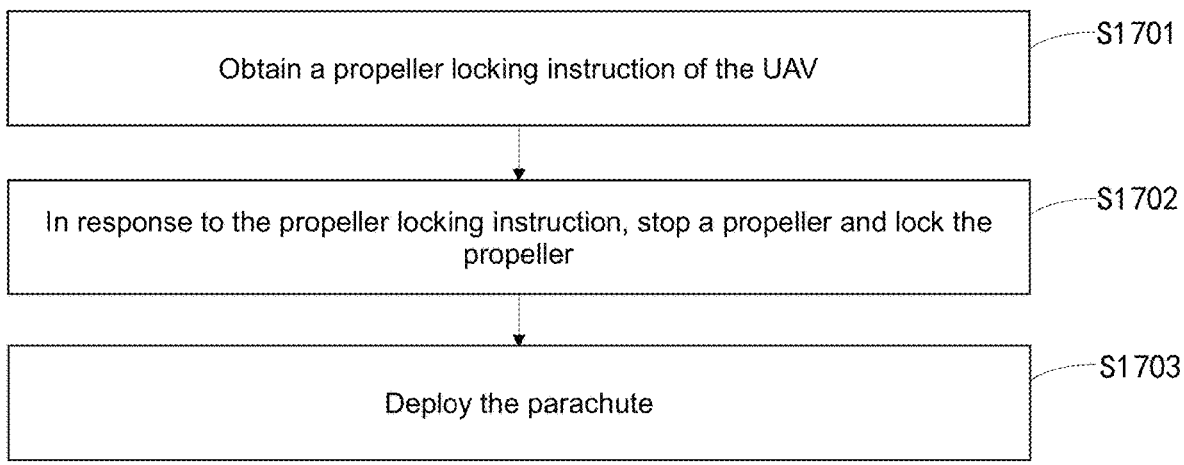
FIG. 16 is a schematic flow chat of a control method for a UAV according to some exemplary embodiments of the present disclosure.

FIG. 16 is a schematic flow chat of a control method for a UAV according to some exemplary embodiments of the present disclosure. With reference to FIG. 16, the present disclosure provides a UAV control method. A parachute is mounted on the UAV, and the UAV includes a propeller(s) to provide flight power. In addition, the execution subject of the above method may be a control device of the UAV. It can be understood that the control device of the UAV may be implemented as software, or a combination of software and hardware. During specific implementation, the UAV control device may be arranged on the UAV, or the UAV control device may be arranged independently of the UAV; in such a case, the control device may be communicated with the UAV and the parachute to control the UAV and the parachute.

Specifically, the UAV control method may include the following steps:

Step S1701: Obtain a propeller locking instruction of the UAV.

Step S1702: In response to the propeller locking instruction, stop a propeller(s) and lock the propeller(s).

Step S1703: Deploy a parachute.

Specifically, the implementation manner and effects of the above steps herein are similar to the implementation manner and effects of step S101 to step S103 in the above descriptions. For details, please refer to the above description, which will not be repeated herein.

In some examples, the UAV is provided with a sensor for sensing flight state data of the UAV. The obtaining of the propeller locking instruction of the UAV may include: obtaining flight state data of the UAV collected by the sensor; if it is determined that the UAV has a flight fault based on the flight state data, generating a propeller locking instruction.

In some examples, the obtaining of the propeller locking instruction of the UAV may include: obtaining the propeller locking instruction sent by the control terminal communicating with the UAV, where the propeller locking instruction is generated by the control terminal detecting the user's propeller locking instruction operation.

In some examples, the UAV includes a motor to mount and drive the propeller. The controlling of the propeller to stop and locking the propeller may include: controlling the motor to stop rotating and preventing the motor from rotating so as to stop the propeller and lock the propeller.

In some examples, after obtaining the propeller locking instruction of the UAV, the method may further include: detecting whether the UAV is in a flight state; if the UAV is in the flight state, allowing to respond to the propeller locking instruction; and if the UAV is not in the flight state, refusing to respond to the propeller locking instruction.

In some examples, the method may also include: controlling the UAV to perform a first safety operation if parachute fault indication information is obtained when the UAV is in the flight state.

In some examples, the controlling of the UAV to perform the first safety operation may include: controlling the UAV to land or return.

In some examples, the controlling of the UAV to land or return may include: detecting whether the UAV is flying over a crowd; and when it is determined that the UAV is flying over the crowd, controlling the UAV to land or return.

In some examples, the detecting whether the UAV is flying over the crowd may include: determining whether the UAV is located in a crowd activity area; and if it is determined that the UAV is located in the crowd activity area, determining that the UAV is flying over the crowd.

In some examples, the method may also include: before the UAV takes off, if the parachute fault indication information is obtained, refusing to respond to an taking off instruction from a user.

In some examples, the obtaining of the parachute fault indication information and refusing to respond to the taking off instruction from the user may include: determining whether the UAV is located in a crowd activity area; and when the UAV is located in the crowd activity area and obtaining the parachute fault indication information, refusing to respond to the taking off instruction from the user.

In some examples, the determining whether the UAV is located in the crowd activity area may include: obtaining a position collected by a satellite positioning device of the UAV; determining whether the UAV is located in the crowd activity area based on the position; if the position is within a preset crowd activity area, determining that the UAV is located in the crowd activity area; otherwise, determining that the UAV is not located in the crowd activity area.

In some examples, the determining whether the UAV is located in the crowd activity area may include: obtaining sensing data collected by an imaging device or a temperature sensor of the UAV; detecting whether there is a crowd in a surrounding environment where the UAV is located based on the sensing data; if it is determined that there is a crowd in the surrounding environment where the UAV is located, determining that the UAV is located in the crowd activity area; otherwise, determining that that the UAV is not located in the crowd activity area.

In some examples, after starting the parachute, the method may further include: obtaining landing position information of the UAV; sending the landing position information to a control terminal that is in communication with the UAV to display the landing position information by the control terminal.

The specific implementation process and implementation effects of the above steps are similar to the specific implementation process and implementation effects of the steps in the above exemplary embodiments of FIG. 1-16. For details, please refer to the above descriptions, which will not be repeated herein.

Figure 17:
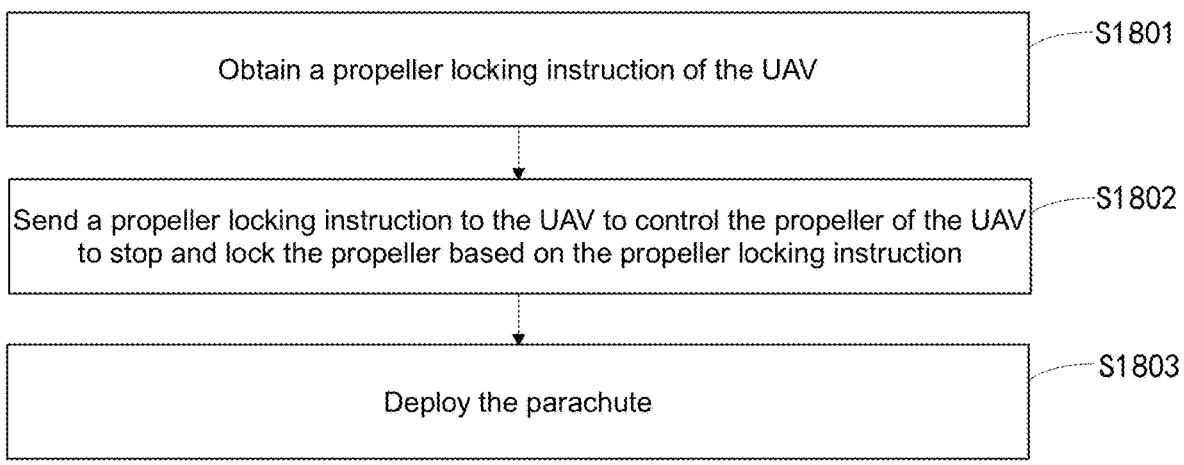
FIG. 17 is a schematic flow chat of a control method for a parachute according to some exemplary embodiments of the present disclosure.

FIG. 17 is a schematic flow chat of a control method for a parachute according to some exemplary embodiments of the present disclosure. With reference to FIG. 17, the present disclosure provides a method of controlling a parachute, where the parachute is installed on the UAV and communicates with the UAV, and the UAV includes a propeller(s) to provide flight power. In addition, the execution subject of the above method may be a control device of the parachute. It can be understood that the control device of the parachute may be implemented as software, or a combination of software and hardware. In specific implementation, the control device of the parachute may be provided on the parachute, or the control device of the parachute may be provided independently of the parachute; in such a case, the control device may in communication with the parachute so as to control the parachute.

Specifically, the parachute control method may include the following steps:

Step S1801: Obtain a propeller locking instruction of the UAV.

The implementation manner and effects of the above steps are similar to the implementation manner and effectd of step S101 in the above exemplary embodiments. For details, please refer to the above description, which will not be described again herein.

Step S1802: Send a propeller locking instruction to the UAV to control the propeller of the UAV to stop and lock the propeller based on the propeller locking instruction.

After obtaining the propeller locking instruction, in order to accurately control the UAV, the propeller locking instruction may be sent to the UAV, so as to control the UAV's propeller(s) to stop and lock the propeller(s) based on the propeller locking instruction.

Step S1803: Start the parachute.

After controlling the UAV propeller to stop and locking the propeller, the parachute may be started. This effectively enables the parachute to be deployed after the propeller is stopped and locked, effectively avoiding the entanglement issue between the motor and the propeller, thereby ensuring the safety and reliability of UAV operation.

In some examples, the parachute includes a sensor(s); the obtaining of the propeller locking instruction of the UAV may include: obtaining flight state data of the UAV collected by the sensor(s); if it is determined that the UAV has a flight fault based on the flight state data, generating a propeller locking instruction.

In some examples, the obtaining of the propeller locking instruction of the UAV may include: obtaining the propeller locking instruction sent by the control terminal in communication with the parachute, where the propeller locking instruction is generated by the control terminal upon detecting a propeller locking instruction operation from a user.

In some examples, the method may further include: monitoring a working state of the parachute to determine whether parachute fault indication information is obtained.

In some examples, the monitoring of the operating state of the parachute may include: obtaining the operating state of the parachute; and when the operating state is a fault state, obtaining the parachute fault indication information.

In some examples, the obtaining of the operating state of the parachute may include: obtaining periodic self-check information of the parachute; and determining the operating state of the parachute based on the self-check information.

In some examples, the self-check information includes at least one of the following: self-check information of equipment (devices) included in the parachute, and self-check information of an environment where the parachute is located.

In some examples, the determining of the operating state of the parachute based on the self-check information may include: when the self-check information meets a set condition, determining that the operating state of the parachute is a normal state; and when the self-check information does not meet the set condition, determining that the operating state of the parachute is an abnormal state.

In some examples, the method may further include: if the parachute fault indication information is obtained, sending the fault indication information to a control terminal that is in communication with the parachute, and displaying the fault indication information by the control terminal.

In some examples, the method may further include: if the parachute fault indication information is obtained, determining a cause of the fault corresponding to the fault indication information; sending the fault indication information and the cause of the fault to a control terminal in communication with the parachute, so that the fault indication information and the cause of the fault may be displayed by the control terminal.

In some examples, after monitoring the operating state of the parachute, the method may further include: sending the operating state of the parachute to the UAV, so that the UAV determines whether to obtain the fault indication information according to the operating state.

In some instances, after obtaining the parachute fault indication information, the method may also include: detecting whether the UAV is in a flight state; when the UAV is in the flight state, generating a return instruction or a landing instruction corresponding to the UAV, and sending the return instruction or the landing instruction to the UAV; when the UAV is not in the flight state, generating a flight prohibition instruction corresponding to the UAV and sending the flight prohibition instruction to the UAV.

The specific implementation process and implementation effects of the above steps herein are similar to the specific implementation process and implementation effects of the steps in the above exemplary embodiments of FIG. 1-16. For details, please refer to the above statement, which will not be described again herein.

Figure 18:
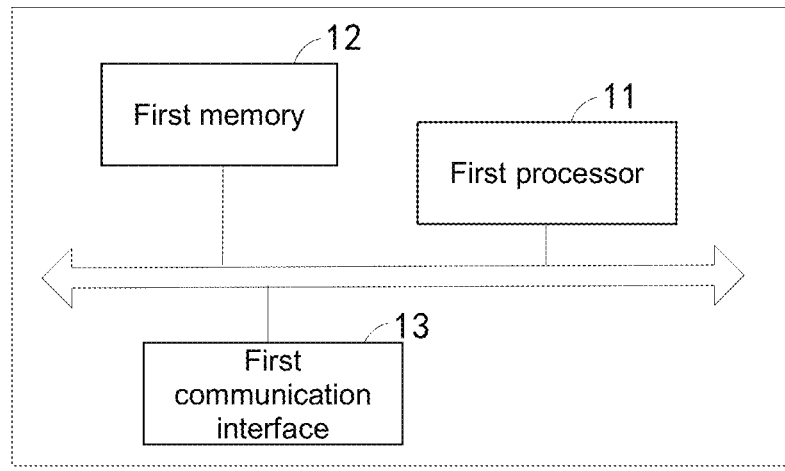
FIG. 18 is a schematic diagram of a control device for a UAV system according to some exemplary embodiments of the present disclosure.

FIG. 18 is a schematic diagram of a control device for a UAV system according to some exemplary embodiments of the present disclosure. With reference to FIG. 18, the present disclosure provides a control device for a UAV system, where the UAV system includes a UAV and a parachute mounted on the UAV, and the UAV includes a propeller(s) used to power flight. The control device of the UAV system may execute the control method of the UAV system shown in FIG. 1. Specifically, the control device may include:
- a first memory 12, configured to store a computer program;
- a first processor 11, configured to execute the computer program stored in the first memory 12 to implement:
- obtaining a propeller locking instruction of the UAV;
- in response to the propeller locking instruction, controlling the propeller to stop and locking the propeller; and
- deploying the parachute.

In some exemplary embodiments, the processor 11 is also configured to perform all or part of the steps in at least some of the exemplary embodiments shown in FIGS. 1 to 15.

The structure of the electronic device thereof may also include a first communication interface 13 for the electronic device to communicate with other devices or communication networks.

In some examples, the UAV system may include a sensor(s) for sensing flight state data of the UAV; when the first processor 11 obtains a propeller locking instruction of the UAV, the first processor 11 may be used to: obtain the flight state data of the UAV collected by the sensor(s); if it is determined that the UAV has a flight fault based on flight state data, generate a propeller locking instruction.

In some examples, the sensor(s) is housed in the UAV or in the parachute.

In some examples, the sensor(s) may include: a first sensor disposed in the UAV and a second sensor disposed in the parachute; when the first processor 11 obtains the flight state data of the UAV collected by the sensor(s), the first processor 11 may be used to: obtain first flight state data of the UAV collected by the first sensor; obtain second flight state data of the UAV collected by the second sensor.

If the first processor 11 determines that the UAV has a flight fault based on the flight state data and generates a propeller locking instruction, the first processor 11 may be used to: if it is determined that the UAV has a flight fault based on the first flight state data or if it is determined that the UAV has a flight fault based on the second flight state data, generate a propeller locking instruction.

In some examples, the sensor(s) may include: a first sensor disposed in the UAV and a second sensor disposed in the parachute; when the first processor 11 obtains the flight state data of the UAV collected by the sensor, the first processor 11 may be used to: obtain first flight state data of the UAV collected by the first sensor; obtain second flight state data of the UAV collected by the second sensor.

When the first processor 11 determines that the UAV has a flight fault based on the flight state data and generates the propeller locking instruction, the first processor 11 may be used to: generate the propeller locking instruction if it is determined that the UAV has a flight fault based on the first flight state data and it is determined that the UAV has a flight fault based on the second flight state data.

In some examples, when the first processor 11 obtains the propeller locking instruction of the UAV, the first processor 11 is used to: obtain the propeller locking instruction sent by the control terminal communicating with the UAV system, where the propeller locking instruction is generated by the control terminal upon detecting a propeller locking instruction operation from a user.

In some examples, the UAV includes a motor for installing and driving a propeller(s). When the first processor 11 controls the propeller to stop and lock the propeller, the first processor 11 is used to: control the motor to stop rotating and prevent the motor from rotating, so as to stop the propeller and lock the propeller.

In some examples, the first processor 11 is also used to monitor the working state of the parachute to determine whether parachute fault indication information is obtained.

In some examples, the first processor 11 is also used to: if the fault indication information is obtained, upload the identity information of the UAV or the UAV user and/or the location of the UAV to a regulatory agency, or perform a fault indication information recording operation.

In some examples, the first processor 11 is also used to: if the fault indication information is obtained, send the fault indication information to a control terminal that is in communication with the UAV, so as to display the fault indication information by the control terminal.

In some examples, the first processor 11 is also used to: if the fault indication information is obtained, determine a cause of the abnormality corresponding to the fault indication information; and Send the fault indication information and the cause of the abnormality to the control terminal in communication with the UAV, so as to display the fault indication information and the cause of the abnormality by the control terminal.

In some examples, after obtaining the propeller locking instruction of the UAV, the first processor 11 is also used to: detect whether the UAV is in a flight state; when the UAV is in the flight state, allow to respond to the propeller locking instruction; and when the UAV is not in the flight state, refuse to respond to the propeller locking instruction.

In some examples, the first processor 11 is also used to: when the UAV is in the flight state, if the parachute fault indication information is obtained, control the UAV to perform the first safety operation.

In some examples, when the first processor 11 controls the UAV to perform the first safety operation, the first processor 11 is also used to: control the UAV to land or return.

In some examples, when the first processor 11 controls the UAV to land or return, the first processor 11 is also used to: detect whether the UAV is in a state of flying over a crowd; and when it is determined that the UAV is flying over the crowd, control the UAV to land or return.

In some examples, when the first processor 11 detects whether the UAV is in a state of flying over the crowd, the first processor 11 is used to: determine whether a position of the UAV is located in a crowd activity area; and if it is determined that the UAV is located in the crowd activity area, determining that the UAV is in a state of flying over the crowd.

In some examples, the first processor 11 is also used to: before the UAV takes off, if the parachute fault indication information is obtained, refuse to respond to a taking off instruction from a user.

In some examples, when the first processor 11 obtains the parachute fault indication information and refuses to respond to the user's taking off instruction, the first processor 11 is used to: determine whether the UAV is located in a crowd activity area; and when the UAV is located in the crowd activity area and obtains the parachute fault indication information, it refuses to respond to the user's taking off instruction.

In some examples, when the first processor 11 determines whether the UAV is located in the crowd activity area, the first processor 11 is also used to: obtain a position collected by the UAV's satellite positioning device; determine whether the UAV is located in the crowd activity area based on the position; if the position is within a preset crowd activity area, determine that the UAV is located in the crowd activity area; otherwise, determine that the UAV is not located in the crowd activity area.

In some examples, when the first processor 11 determines whether the UAV is located in the crowd activity area, the first processor 11 is also used to: obtain sensing data collected by the UAV's imaging device or temperature sensor; determine whether the UAV is located in the crowd activity area based on sensing data; if it is determined that there is a crowd in a surrounding environment where the UAV is located, determine that the UAV is located in the crowd activity area; otherwise, determine that the UAV is not located in the crowd activity area.

In some examples, when the first processor 11 obtains the parachute fault indication information, the first processor 11 is also used to: obtain an operating state of the parachute; and when the operating state is a fault state, obtain the parachute fault indication information.

In some examples, when the first processor 11 obtains the operating state of the parachute, the first processor 11 is also used to: obtain periodic self-check information of the parachute; and determine the operating state of the parachute based on the self-check information.

In some examples, the self-test information includes at least one of the following: self-check information of equipment included in the parachute, and self-check information of the environment where the parachute is located.

In some examples, when the first processor 11 determines the operating state of the parachute based on the self-check information, the first processor 11 is also used to: determine that the operating state of the parachute is a normal state when the self-check information meets a set condition; and when the self-check information does not meet the set condition, determine that the operating state of the parachute is an abnormal state.

In some examples, the first processor 11 is also used to display the parachute fault indication information.

In some examples, the first processor 11 is also used to: determine a cause of the abnormality corresponding to the fault indication information; and display the fault indication information and the cause of the abnormality.

In some examples, after starting the parachute, the first processor 11 is further used to: obtain landing position information of the UAV; send the landing position information to a control terminal in communication with the UAV, and display the landing position information by the control terminal.

In some examples, the first processor 11 is also used to: obtain the device information sent by the parachute; send the device information to the control terminal in communication with the UAV, such that the device information may be displayed or the device information may be stored by the control terminal.

The device shown in FIG. 18 may perform the method of the exemplary embodiments shown in FIGS. 1 to 15. For parts that are not described in detail herein, reference can be made to the relevant descriptions of the exemplary embodiments shown in FIGS. 1 to 15. For the implementation process and technical effects of this technical solution, please refer to the description in the exemplary embodiments shown in FIGS. 1 to 15, which will not be described again herein.

Moreover, some exemplary embodiments of the present disclosure provide a computer storage medium for storing computer software instructions used in the electronic device. It includes programs for executing the control method for the UAV system in at least some of the exemplary embodiments shown in FIGS. 1 to 15.

Figure 19:
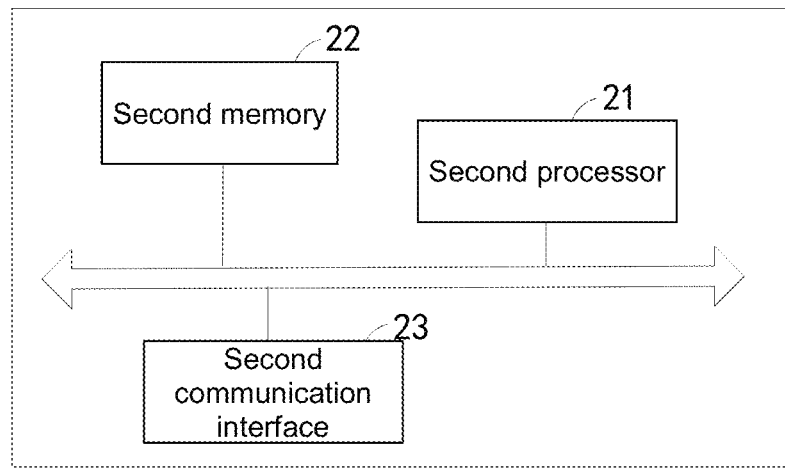
FIG. 19 is a schematic diagram of the structure of a UAV according to some exemplary embodiments of the present disclosure.

FIG. 19 is a schematic diagram of the structure of a UAV according to some exemplary embodiments of the present disclosure. As shown in FIG. 19, the present disclosure provides a UAV, where the UAV may be installed with a parachute. The UAV includes a propeller(s) used to power flight. The UAV may execute the UAV control method shown in FIG. 16. Specifically, the UAV may include:

a second memory 22, configured to store a computer program;

a second processor 21, configured to execute the computer program stored in the second memory 22 to implement:

obtaining a propeller locking instruction of the UAV;

in response to the propeller locking instruction, controlling the propeller to stop and locking the propeller; and deploying the parachute.

In some exemplary embodiments, the processor 21 is also configured to perform all or part of the steps in at least some of the exemplary embodiments shown in FIGS. 1 to 15.

The structure of the electronic device thereof may also include a second communication interface 23 for the electronic device to communicate with other devices or communication networks.

In some examples, the UAV may be provided with a sensor(s) for sensing flight state data of the UAV; when the second processor 21 obtains a propeller locking instruction of the UAV, the second processor 21 may be used to: obtain the flight state data of the UAV collected by the sensor(s); if it is determined that the UAV has a flight fault based on flight state data, generate a propeller locking instruction.

In some examples, when the second processor 21 obtains the propeller locking instruction of the UAV, the second processor 21 is used to: obtain the propeller locking instruction sent by the control terminal communicated with the UAV, where the propeller locking instruction is generated by the control terminal upon detecting a user's propeller locking instruction operation.

In some examples, the UAV includes a motor(s) to mount and drive the propeller(s). When the second processor 21 controls the propeller to stop and locks the propeller, the second processor 21 is used to: control the motor to stop rotating and prevent the motor from rotating, so as to stop the propeller and lock the propeller.

In some examples, after obtaining the propeller locking instruction of the UAV, the second processor 21 is also used to: detect whether the UAV is in a flight state; when the UAV is in the flight state, allow to respond to the propeller locking instruction; and when the UAV is in the flight state, refuse to respond to the propeller locking instruction.

In some examples, the second processor 21 is also used to: when the UAV is in the flight state, if the parachute fault indication information is obtained, control the UAV to perform a first safety operation.

In some examples, when the second processor 21 controls the UAV to perform the first safety operation, the second processor 21 is used to: control the UAV to land or return.

In some examples, when the second processor 21 controls the UAV to land or return, the second processor 21 is used to: detect whether the UAV is in a state of flying over a crowd; and when it is determined that the UAV is flying over the crowd, control the UAV to land or return.

In some examples, when the second processor 21 detects whether the UAV is in a state of flying over the crowd, the second processor 21 is used to: determine whether the UAV is located in a crowd activity area; if it is determined that the UAV is located in the crowd activity area, determine that the UAV is in a state of flying over the crowd.

In some examples, the second processor 21 is also used to: before the UAV takes off, if the parachute fault indication information is obtained, refuse to respond to the user's taking off instruction.

In some examples, when the second processor 21 obtains the parachute fault indication information and refuses to respond to the user's taking off instruction, the second processor 21 is also used to: determine whether the UAV is located in a crowd activity area; when the UAV is located in the crowd activity area and obtains the parachute fault indication information, refuse to respond to the user's taking off instruction.

In some examples, when the second processor 21 detects whether the UAV is flying over a crowd, the second processor 21 is used to: obtain a position collected by the UAV's satellite positioning device; determine whether the UAV is located in the crowd activity area based on the position; if the position is within a preset crowd activity area, determine that the UAV is located in the crowd activity area; otherwise, determine that the UAV is not located in the crowd activity area.

In some examples, when the second processor 21 detects whether the UAV is in a state of flying over a crowd, the second processor 21 is used to: obtain sensing data collected by the UAV's imaging device or temperature sensor; and detect whether there is a crowd in the surrounding environment where the UAV is located based on the sensing data; if it is determined that there is a crowd in the surrounding environment where the UAV is located, determine that the UAV is located in the crowd activity area; otherwise, determine that the UAV is not located in the crowd activity area.

In some examples, after starting the parachute, the second processor 21 is also used to: obtain landing position information of the UAV; send the landing position information to a control terminal that is in communication with the UAV, so that the landing position information may be displayed by the control terminal.

The UAV shown in FIG. 19 may perform the method of the exemplary embodiments shown in FIGS. 1 to 15. For parts that are not described in detail herein, reference can be made to the relevant descriptions of the exemplary embodiments shown in FIGS. 1 to 15. For the implementation process and technical effects of this technical solution, please refer to the description in the exemplary embodiments shown in FIGS. 1 to 15, which will not be described again herein.

Moreover, some exemplary embodiments of the present disclosure provide a computer storage medium for storing computer software instructions used in the electronic device. It includes programs for executing the control method for the UAV in at least some of the exemplary embodiments shown in FIGS. 1 to 15.

Figure 20:
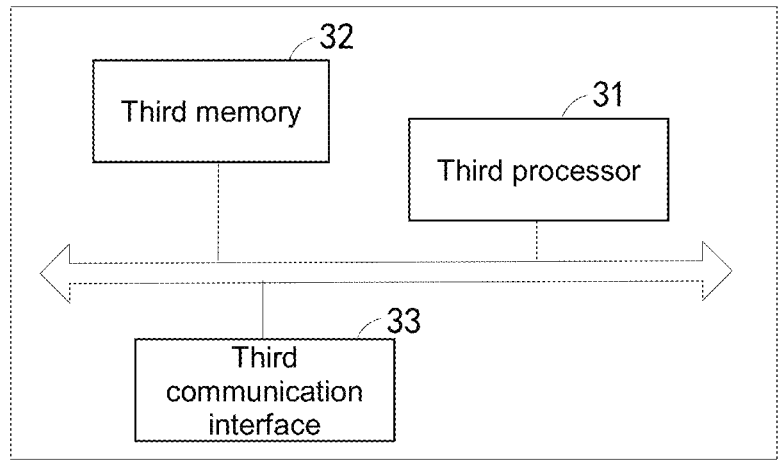
FIG. 20 is a schematic diagram of the structure of a parachute according to some exemplary embodiments of the present disclosure.

FIG. 20 is a schematic diagram of the structure of a parachute according to some exemplary embodiments of the present disclosure. As shown in FIG. 20, the present disclosure provides a parachute that may be installed on a UAV and communicate with the UAV, where the UAV may be installed with a parachute. Specifically, the parachute may perform the parachute control method shown in FIG. 17 above. Specifically, the parachute may include:

a third memory 32, configured to store a computer program;

a third processor 31, configured to execute the computer program stored in the third memory 32 to implement:

obtaining a propeller locking instruction of the UAV;

send a propeller locking instruction to the UAV to control the UAV's propeller to stop and lock the propeller based on the propeller locking instruction; and deploying the parachute.

In some exemplary embodiments, the processor 31 is also configured to perform all or part of the steps in at least some of the exemplary embodiments shown in FIGS. 1 to 15.

The structure of the electronic device thereof may also include a third communication interface 33 for the electronic device to communicate with other devices or communication networks.

In some examples, a sensor(s) is included in the parachute. When the third processor 31 obtains the propeller locking instruction of the UAV, the third processor 31 is also used to: obtain flight state data of the UAV collected by the sensor(s); determine whether the UAV has a flight fault based on the flight state data, if it is determined that the UAV has a flight fault, generate a propeller locking instruction.

In some examples, when the third processor 31 obtains the propeller locking instruction, the third processor 31 is also used to: obtain the propeller locking instruction sent by a control terminal in communication with the parachute, where the propeller locking instruction is generated by the control terminal upon detecting a propeller locking instruction operation from a user.

In some examples, the third processor 31 is also used to monitor the working state of the parachute to determine whether parachute fault indication information is obtained.

In some examples, when the third processor 31 obtains the parachute fault indication information, the third processor 31 is also used to: obtain the operating state of the parachute; when the operating state is a fault state, obtain the parachute fault indication information.

In some examples, when the third processor 31 obtains the operating state of the parachute, the third processor 31 is also used to: obtain periodic self-check information of the parachute; and determine the operating state of the parachute based on the self-check information.

In some examples, the self-check information includes at least one of the following: self-check information of equipment included in the parachute, and self-check information of the environment where the parachute is located.

In some examples, when the third processor 31 determines the operating state of the parachute based on the self-check information, the third processor 31 is also used to: determine that the operating state of the parachute is a normal state when the self-check information meets a set condition; and when the self-check information does not meet the set condition, determine that the operating state of the parachute is an abnormal state.

In some examples, the third processor 31 is also used to: if the parachute fault indication information is obtained, send the fault indication information to a control terminal in communication with the parachute, so that the fault indication information may be displayed by the control terminal.

In some examples, the third processor 31 is also used to: if the parachute fault indication information is obtained, determine a cause of abnormality corresponding to the fault indication information; send the fault indication information and the cause of abnormality to a control terminal in communication with the parachute, so that the fault indication information and the cause of abnormality are displayed by the control terminal.

In some examples, after monitoring the operating state of the parachute, the third processor 31 is also used to: send the operating state of the parachute to the UAV, so that the UAV determines whether to obtain the fault indication information based on the operating state.

In some examples, after obtaining the parachute fault indication information, the third processor 31 is also used to: detect whether the UAV is in a flight state; when the UAV is in the flight state, generating a return instruction or landing instruction corresponding to the UAV, and send the return instruction or landing instruction to the UAV; when the UAV is not in the flight state, generating a flight prohibition instruction corresponding to the UAV and send the flight prohibition instruction to the UAV.

The parachute shown in FIG. 20 may perform the method of the exemplary embodiments shown in FIGS. 1 to 15. For parts that are not described in detail herein, reference can be made to the relevant descriptions of the exemplary embodiments shown in FIGS. 1 to 15. For the implementation process and technical effects of this technical solution, please refer to the description in the exemplary embodiments shown in FIGS. 1 to 15, which will not be described again herein.

Moreover, some exemplary embodiments of the present disclosure provide a computer storage medium for storing computer software instructions used in the electronic device. It includes programs for executing the control method for the parachute in at least some of the exemplary embodiments shown in FIGS. 1 to 15.

Figure 21:
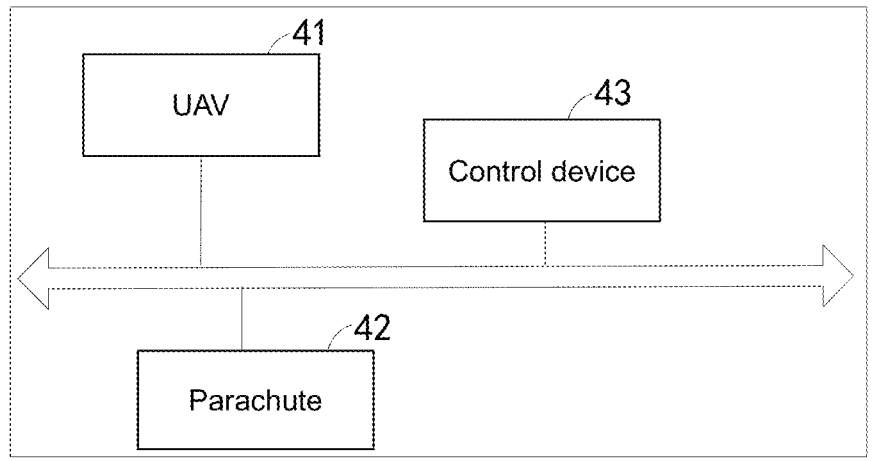
FIG. 21 is a schematic diagram of the structure of a UAV system according to some exemplary embodiments of the present disclosure.

FIG. 21 is a schematic diagram of the structure of a UAV system according to some exemplary embodiments of the present disclosure. With reference to FIG. 21, this disclosure provides a UAV system, which may include:
a UAV 41, including a propeller f13 used to provide flight power;
a parachute 42, installed on the UAV 41;
a control device 43 of the UAV system shown in FIG. 18, which is used to control the UAV 41 and the parachute 42.

The control device 43 may be provided on the UAV 41 or the parachute 42. The implementation principle, implementation effects and implementation process of the UAV system shown in FIG. 21 herein are similar to the implementation principle, implementation effects and implementation process of the control device of the UAV system in the above-mentioned exemplary embodiments of FIG. 18. For details, reference may be made to the descriptions in the exemplary embodiments shown in FIG. 18, which will not be described again herein.

Figure 22:
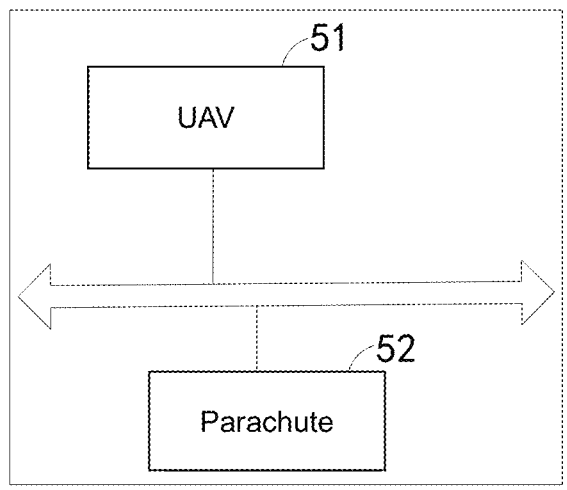
FIG. 22 is a schematic diagram of the structure of a UAV system according to some exemplary embodiments of the present disclosure.

FIG. 22 is a schematic diagram of the structure of a UAV system according to some exemplary embodiments of the present disclosure. With reference to FIG. 22, this disclosure provides a UAV system, which may include:
a UAV 51 of FIG. 19 above, including a propeller(s) for providing flight power;
a parachute 52, installed on the UAV 51.

The implementation principle, implementation effects and implementation process of the UAV system shown in FIG. 22 herein are similar to the implementation principle, implementation effects and implementation process of the control device of the UAV 51 in the above-mentioned exemplary embodiments of FIG. 19. For details, reference may be made to the descriptions in the exemplary embodiments shown in FIG. 19, which will not be described again herein.

Figure 23:
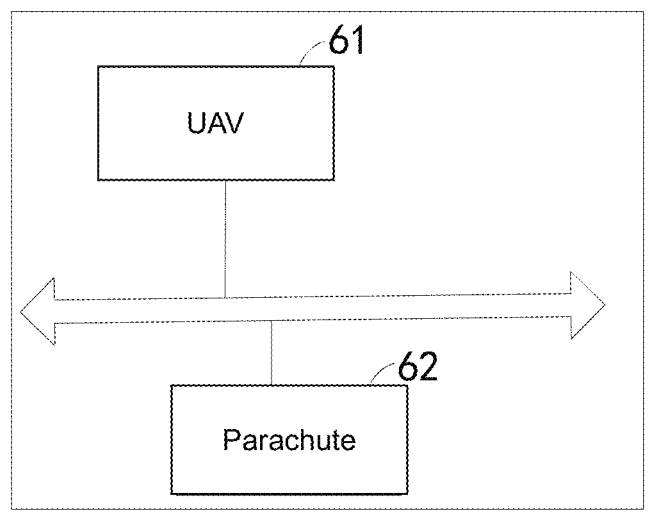
FIG. 23 is a schematic diagram of the structure of a UAV system according to some exemplary embodiments of the present disclosure.

FIG. 23 is a schematic diagram of the structure of a UAV system according to some exemplary embodiments of the present disclosure. With reference to FIG. 23, this disclosure provides a UAV system, which may include:
a UAV 61, including a propeller(s) for providing flight power;
a parachute 62 as shown in FIG. 20, installed on the UAV 51.

The implementation principle, implementation effects and implementation process of the UAV system shown in FIG. 23 herein are similar to the implementation principle, implementation effects and implementation process of the control device of the parachute 62 in the above-mentioned exemplary embodiments of FIG. 20. For details, reference may be made to the descriptions in the exemplary embodiments shown in FIG. 20, which will not be described again herein.

The technical solutions and technical features in each of the above exemplary embodiments may be used individually or in combination if no confliction occurs. As long as within the scope understood by a person skilled in the art, they are equivalent embodiments within the scope of protection of the present disclosure.

For the exemplary embodiments provided by the present disclosure, it should be understood that the disclosed remote control devices and methods may be implemented in other ways. For example, the remote control device embodiments described above are only illustrative. For example, the division of modules or units is only a logical function division. In actual implementation, there may be other division methods. For example, multiple units or components may be combined or integrated into another system, or some features may be omitted, or not implemented. In addition, the coupling or direct coupling or communication connection between each other shown or discussed may be an indirect coupling or communication connection through some interfaces, remote control devices or units, which may be in electrical, mechanical or other forms.

The units described as separate components may or may not be physically separate. A component shown as a unit may or may not be a physical unit, that is, it may be located in one place, or it may be distributed over multiple network units. Some or all of the units may be selected according to actual needs to achieve the purpose of the solution of the present disclosure.

Moreover, each functional unit in various embodiments of the present disclosure may be integrated into one processing unit, or each unit may exist physically alone, or two or more units may be integrated into one unit. The above integrated units may be implemented in the form of hardware or software functional units.

If an integrated unit is implemented in the form of a software functional unit and sold or used as an independent product, it may be stored in a computer-readable storage medium. Based on this understanding, for the technical solutions of the present disclosure, the essential parts or the parts contributing to the existing technology, or all or part of the technical solutions may be embodied in the form of a software product. The computer software product may be stored in a storage medium and may include a number of instructions to cause a computer processor to execute all or part of the steps of the methods described in various exemplary embodiments of the present disclosure. The aforementioned storage media may include: a USB disk, a mobile hard disk, a read-only memory (ROM), a random access memory (RAM), a magnetic disk or optical disk, and other media that can store program code.

The above are only examples of the present disclosure and do not limit the scope of the present disclosure. Any equivalent structure or equivalent process made based on the contents of the description and drawings of the present disclosure, or directly or indirectly applications in other related technical fields, are all included in the scope of protection of the present disclosure.

Finally, it should be noted that the above exemplary embodiments are only used to illustrate the technical solutions of the present disclosure, but not to limit them. Although the present disclosure has been described in detail with reference to the foregoing exemplary embodiments, a person of ordinary skill in the art should understand that the technical solutions recorded in the foregoing exemplary embodiments may be modified or equivalent substitutions for some or all of the technical features may be made. These modifications or substitutions do not cause the essence of the corresponding technical solution to depart from the scope of the technical solutions of the embodiments of the present disclosure.

What is claimed is:

1. An aircraft system, comprising:
   an aircraft, comprising:
   at least one propeller to provide a flight power for the aircraft;
   a communication interface configured to communicate with a parachute;
   at least one storage medium, storing at least one set of instructions for controlling the aircraft system; and
   at least one processor in communication with the at least one storage medium and the communication interface, wherein during operation, the at least one processor executes the at least one set of instructions to:
   obtain a propeller locking instruction to the aircraft, and
   perform a target operation from an operation set of the aircraft based on the propeller locking instruction,
   wherein the operation set comprises a first operation corresponding to a scenario where the aircraft is in a flight state, the first operation comprises:
   in response to the propeller locking instruction, locking the at least one propeller to prevent the at least one propeller from further rotation due to air flow during descending of the aircraft, and
   deploying the parachute after the at least one propellor is locked.

2. The aircraft system according to claim 1, wherein the operation set further comprises a second operation; the second operation corresponds to a scenario where the aircraft is not in the flight state and comprises: refusing to respond to the propeller locking instruction;
   wherein to perform the target operation from an operation set of the aircraft, the at least one processor further executes the set of instructions to:
   detect whether the aircraft is in a flight state; and
   perform, based on a detecting result, the first operation or a second operation.

3. The aircraft system according to claim 1, further comprising
   a sensor to sense flight state data of the aircraft, wherein
   to obtain the propeller locking instruction of the aircraft, the at least one processor further executes the at least one set of instructions to:
   obtain the flight state data from the sensor, wherein the flight state data indicates that the aircraft has a flight fault, and
   generate the propeller locking instruction.

4. The aircraft system according to claim 3, wherein
   the sensor comprises at least one of a first sensor disposed in the aircraft or a second sensor disposed in the parachute; and
   to obtain the flight state data from the sensor, the at least one processor further executes the at least one set of instructions to:
   determine that the aircraft has the flight fault based on at least one of first flight state data or second flight state data, wherein
   the first flight state data is obtained from the first sensor, and the second flight state data is obtained from the second sensor.

5. The aircraft system according to claim 1, wherein
   the aircraft further comprises: a motor connected to the at least one propeller to drive the at least one propeller; and
   to control the at least one propeller to stop and lock the at least one propeller, the at least one processor further executes the at least one set of instructions to:
   control the motor to stop rotating and prevent the motor from rotating so as to stop and lock the at least one propeller.

6. The aircraft system according to claim 1, wherein prior to or during a flight, the at least one processor further executes the at least one set of instructions to:
monitor a working state of the parachute; and
perform, based on the flight state of the aircraft, a fault-corresponding operation after obtaining fault indication information of the parachute.

7. The aircraft system according to claim 6, wherein the fault-corresponding operation comprises at least one of:
based on the fault indication information, uploading at least one of identity information of the aircraft, identity information of a user of the aircraft, or location information of the aircraft to a regulatory agency, or performing a fault indication information recording operation; or
based on the fault indication information, sending the fault indication information to a control terminal in communication with the aircraft to enable the control terminal to display the fault indication information.

8. The aircraft system according to claim 6, wherein the fault-corresponding operation comprises:
determining an abnormality cause corresponding to the fault indication information; and
sending the fault indication information and the abnormality cause to a control terminal to instruct the control terminal to display the fault indication information and the abnormality cause, where the control terminal is in communication with the aircraft.

9. The aircraft system according to claim 6, wherein the fault-corresponding operation comprises:
when the aircraft is in the flight state, controlling the aircraft to perform a first safety operation,
wherein the first safety operation comprises controlling the aircraft to land or return.

10. The aircraft system according to claim 9, wherein the controlling of the aircraft to land or return comprises:
when the aircraft is flying over a crowd, controlling the aircraft to land or return.

11. The aircraft system according to claim 6, wherein the fault-corresponding operation comprises:
refusing to respond to a takeoff instruction prior to the flight.

12. The aircraft system according to claim 6, wherein the fault-corresponding operation comprises:
when the aircraft is located in a crowd activity area and obtains the fault indication information of the parachute, refusing to respond to a takeoff instruction.

13. The aircraft system according to claim 1, further comprising:
a control terminal in communication with the aircraft,
wherein the at least one processor further executes the at least one set of instructions to:
obtain landing position information of the aircraft after deploying the parachute,
send the landing position information to the control terminal, and display, on the control terminal, the landing position information.

14. The aircraft system according to claim 1, further comprising:
a control terminal in communication with the aircraft,
wherein the at least one processor further executes the at least one set of instructions to:
obtain equipment information sent by the parachute,
send the equipment information to the control terminal, and
perform, on the control terminal, at least one of displaying the equipment information or storing the equipment information.

15. A method for controlling an aircraft system, comprising:
obtaining, by an aircraft, a propeller locking instruction, wherein the aircraft is equipped with a parachute, and the aircraft comprises at least one propeller to provide flight power; and
performing a target operation from an operation set of the aircraft-based on the propeller locking instruction, wherein the operation set comprises a first operation corresponding to a scenario where the aircraft is in a flight state and the first operation comprises:
in response to the propeller locking instruction, locking the at least one propeller to prevent the at least one propeller from further rotation due to air flow during descending of the air craft, and
deploying, by the aircraft, the parachute after the at least one propellor is locked.

16. The method according to claim 15, wherein the operation set further comprises a second operation; the second operation corresponds to a scenario where the aircraft is not in the flight state and comprises: refusing to respond to the propeller locking instruction;
wherein the performing of the target operation from the operation set of the aircraft based on the propeller locking instruction further comprises:
detecting whether the aircraft is in a flight state; and
performing, based on a detecting result, the first operation or a second operation.

17. The method according to claim 15, wherein
the aircraft system comprises a sensor to sense flight state data of the aircraft; and
the obtaining of the propeller locking instruction comprises:
obtaining the flight state data from the sensor, wherein the flight state data indicates that the aircraft has a flight fault, and
generating the propeller locking instruction.

18. The method according to claim 15, wherein
the aircraft comprises a motor connected to the at least one propeller to drive the at least one propeller; and
the locking of the at least one propeller comprises:
controlling the motor to stop rotating and preventing the motor from rotating so as to stop and lock the at least one propeller.

19. A parachute, comprising:
at least one storage medium storing at least one set of instructions for controlling an aircraft system, wherein the aircraft system comprises an aircraft, which comprises at least one propeller to provide a flight power for the aircraft, and a communication interface in communication with the parachute;
at least one processor in communication with the at least one storage medium and the communication interface, wherein during operation, the at least one processor executes the at least one set of instructions to:
obtain a propeller locking instruction to the aircraft,
perform a target operation from an operation set of the aircraft based on the propeller locking instruction, wherein the operation set comprises a first operation corresponding to a scenario where the aircraft is in a flight state, the first operation comprises:

in response to the propeller locking instruction, locking the at least one propeller to prevent the at least one propeller from further rotation due to air flow during descending of the aircraft, deploy the parachute after the at least one propellor is locked.

20. The parachute according to claim 19, wherein the parachute comprises a sensor; and the at least one processor further executes the set of instructions:

obtaining flight state data of the aircraft collected by the sensor, and generating the propeller locking instruction upon determining, based on the flight state data, that the aircraft has a flight fault, or monitoring a working state of the parachute to determine whether fault indication information of the parachute is obtained.

\* \* \* \* \*